(12) United States Patent
Alexandrovich et al.

(10) Patent No.: US 12,141,450 B2
(45) Date of Patent: *Nov. 12, 2024

(54) PROCESSORS, METHODS AND SYSTEMS TO ALLOW SECURE COMMUNICATIONS BETWEEN PROTECTED CONTAINER MEMORY AND INPUT/OUTPUT DEVICES

(71) Applicant: INTEL CORPORATION, Santa Clara, CA (US)

(72) Inventors: Ilya Alexandrovich, Haifa (IL); Vladimir Beker, Ariel (IL); Gideon Gerzon, Zichron Yaakov (IL); Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,277

(22) Filed: Dec. 16, 2022

(65) Prior Publication Data
US 2023/0266888 A1 Aug. 24, 2023

Related U.S. Application Data

(63) Continuation of application No. 16/882,637, filed on May 25, 2020, now Pat. No. 11,531,475, which is a
(Continued)

(51) Int. Cl.
*G06F 3/06* (2006.01)
*G06F 13/16* (2006.01)
(Continued)

(52) U.S. Cl.
CPC .......... *G06F 3/0622* (2013.01); *G06F 3/0637* (2013.01); *G06F 3/0673* (2013.01);
(Continued)

(58) Field of Classification Search
CPC .... G06F 3/0622; G06F 3/0637; G06F 3/0673; G06F 13/4068; G06F 21/78; G06F 21/79; G06F 21/85
(Continued)

(56) References Cited

U.S. PATENT DOCUMENTS 5,987,557 A * 11/1999 Ebrahim ............. G06F 12/1483
710/200
6,044,415 A 3/2000 Futral et al.
(Continued)

FOREIGN PATENT DOCUMENTS

CN 1723448 A 1/2006
CN 101520738 A 9/2009
(Continued)

OTHER PUBLICATIONS

Allowance Decision of Examination, TW App. No. 105125467, Jun. 1, 2020, 3 pages (1 page of English Translation and 2 pages of Original Document).
(Continued)

*Primary Examiner* — Christopher B Shin
(74) *Attorney, Agent, or Firm* — Nicholson De Vos Webster & Elliott LLP

(57) ABSTRACT

An integrated circuit includes protected container access control logic to perform a set of access control checks and to determine whether to allow a device protected container module (DPCM) and an input and/or output (I/O) device to communicate securely through one of direct memory access (DMA) and memory-mapped input/output (MMIO). The DPCM and the I/O device are allowed to communicate securely if it is determined that at least the DPCM and the I/O device are mapped to one another, an access address associated with the communication resolves into a protected container memory, and a page of the protected container
(Continued)

memory into which the access address resolves allows for the aforementioned one of DMA and MMIO. In some cases, a Security Attributes of Initiator (SAI) or security identifier may be used to obtain a DPCM identifier or attest that access is from a DPCM mapped to the I/O device. In some cases, a determination may be made that a type of access is compatible with one or more allowed access types for the page as represented in a protected container page metadata structure.

25 Claims, 21 Drawing Sheets

Related U.S. Application Data continuation of application No. 14/866,478, filed on Sep. 25, 2015, now Pat. No. 10,664,179.

(51) Int. Cl.
*G06F 13/40* (2006.01)
*G06F 21/78* (2013.01)
*G06F 21/79* (2013.01)
*G06F 21/85* (2013.01)

(52) U.S. Cl.
CPC .......... *G06F 13/16* (2013.01); *G06F 13/4068* (2013.01); *G06F 21/78* (2013.01); *G06F 21/79* (2013.01); *G06F 21/85* (2013.01)

(58) Field of Classification Search
USPC .......................................................... 711/63
See application file for complete search history.

(56) References Cited

U.S. PATENT DOCUMENTS

| | | | |
|---|---|---|---|
| 6,510,522 B1* | 1/2003 | Heinrich ................ | G06F 21/70 726/19 |
| 6,662,242 B2 | 12/2003 | Holm et al. | |
| 6,785,790 B1* | 8/2004 | Christie .............. | G06F 12/1475 711/163 |
| 8,528,062 B1 | 9/2013 | Connor | |
| 8,631,212 B2 | 1/2014 | Kegel et al. | |
| 8,972,746 B2 | 3/2015 | Johnson et al. | |
| 9,355,262 B2 | 5/2016 | Leslie-Hurd et al. | |
| 9,703,715 B2 | 7/2017 | Goldsmith et al. | |
| 9,710,401 B2 | 7/2017 | Rozas et al. | |
| 9,710,622 B2 | 7/2017 | Pandey et al. | |
| 9,747,102 B2 | 8/2017 | Leslie et al. | |
| 9,767,044 B2 | 9/2017 | Chhabra et al. | |
| 9,792,448 B2 | 10/2017 | Kaplan et al. | |
| 9,942,035 B2 | 4/2018 | Rozas et al. | |
| 10,152,602 B2 | 12/2018 | Kaplan et al. | |
| 10,176,122 B2 | 1/2019 | Kaplan et al. | |
| 10,664,179 B2 | 5/2020 | Alexandrovich et al. | |
| 11,531,475 B2* | 12/2022 | Alexandrovich ... | G06F 13/4068 |
| 2004/0177261 A1 | 9/2004 | Watt et al. | |
| 2005/0114586 A1 | 5/2005 | Brice et al. | |
| 2006/0209724 A1 | 9/2006 | Arndt et al. | |
| 2007/0038839 A1 | 2/2007 | Hummel et al. | |
| 2007/0073919 A1 | 3/2007 | Daly et al. | |
| 2007/0226450 A1 | 9/2007 | Engbersen et al. | |
| 2008/0301467 A1 | 12/2008 | Saito | |
| 2009/0276605 A1 | 11/2009 | Arndt et al. | |
| 2012/0159184 A1 | 6/2012 | Johnson et al. | |
| 2013/0159726 A1 | 6/2013 | McKeen et al. | |
| 2013/0198853 A1 | 8/2013 | McKeen et al. | |
| 2013/0232344 A1 | 9/2013 | Johnson et al. | |
| 2014/0006711 A1* | 1/2014 | Xing ................ | G06F 12/10 711/E12.098 |
| 2014/0068704 A1 | 3/2014 | Grewal et al. | |
| 2014/0157410 A1 | 6/2014 | Dewan et al. | |
| 2014/0173275 A1 | 6/2014 | Johnson et al. | |
| 2014/0189242 A1 | 7/2014 | McKeen et al. | |
| 2014/0189246 A1 | 7/2014 | Xing et al. | |
| 2014/0189261 A1 | 7/2014 | Hildesheim et al. | |
| 2014/0189325 A1 | 7/2014 | McKeen et al. | |
| 2014/0189326 A1 | 7/2014 | Leslie et al. | |
| 2014/0223197 A1 | 8/2014 | Gueron et al. | |
| 2014/0282819 A1* | 9/2014 | Sastry .................... | G06F 21/57 726/1 |
| 2014/0297962 A1 | 10/2014 | Rozas et al. | |
| 2015/0006968 A1 | 1/2015 | Shanbhogue et al. | |
| 2015/0033012 A1 | 1/2015 | Scarlata et al. | |
| 2015/0033034 A1 | 1/2015 | Gerzon et al. | |
| 2015/0033316 A1 | 1/2015 | Scarlata et al. | |
| 2015/0088586 A1 | 3/2015 | Pavlas et al. | |
| 2015/0089173 A1 | 3/2015 | Chhabra et al. | |
| 2015/0089502 A1* | 3/2015 | Horovitz ............ | G06F 9/45558 718/1 |
| 2015/0199509 A1* | 7/2015 | Wille ...................... | G06F 21/74 726/16 |
| 2015/0331715 A1 | 11/2015 | Sathyanarayana | |
| 2016/0085695 A1* | 3/2016 | Leslie-Hurd .............. | G06F 9/52 711/163 |
| 2016/0180114 A1 | 6/2016 | Sastry et al. | |
| 2016/0378684 A1 | 12/2016 | Zmudzinski et al. | |
| 2016/0378688 A1 | 12/2016 | Rozas et al. | |
| 2017/0054557 A1 | 2/2017 | Rozas et al. | |
| 2017/0083724 A1 | 3/2017 | Chhabra et al. | |
| 2017/0185533 A1 | 6/2017 | Rozas et al. | |
| 2017/0185776 A1 | 6/2017 | Robinson et al. | |
| 2017/0277898 A1 | 9/2017 | Powell et al. | |
| 2018/0024854 A1 | 1/2018 | Wang et al. | |
| 2018/0136971 A1 | 5/2018 | Dong et al. | |
| 2018/0165224 A1 | 6/2018 | Brown et al. | |
| 2018/0246751 A1 | 8/2018 | Dong et al. | |
| 2020/0393977 A1 | 12/2020 | Alexandrovich et al. | |

FOREIGN PATENT DOCUMENTS

| | | |
|---|---|---|
| CN | 103136468 A | 6/2013 |
| CN | 103778075 A | 5/2014 |
| CN | 104823173 A | 8/2015 |
| TW | 1264639 B | 10/2006 |
| TW | 1383294 B | 1/2013 |
| TW | 201415280 A | 4/2014 |
| TW | 1457829 B | 10/2014 |
| TW | 201525690 A | 7/2015 |
| WO | 2017/052916 A1 | 3/2017 |

OTHER PUBLICATIONS

Anati, et al., "Innovative Technology for CPU Based Attestation and Sealing", Intel Corporation, 2013, 7 pages.
Applicant Initiated Interview Summary, U.S. Appl. No. 14/866,478, Jan. 13, 2020, 3 pages.
Baumann et al., "Shielding Applications from an Untrusted Cloud with Haven," Proceedings of the 11th USENIX Symposium on Operating Systems Design and Implementation (OSDI '14), Oct. 6-8, 2014, pp. 267-283.
Corbet, et al., "Linux Device Drivers: Chapter 15—Memory Mapping and DMA", Third Edition, 2005, 70 pages.
Final Office Action, U.S. Appl. No. 16/882,637, Aug. 25, 2021, 24 pages.
First Office Action and Search Report, CN App. No. 201680055596. 2, Nov. 22, 2021, 31 pages (16 pages of English Translation and 15 pages of Original Document).
Hoekstra, et al., "Using Innovative Instructions to Create Trustworthy Software Solutions", Intel Corporation, 2013, 8 pages.
Hoekstra, Matthew, "Intel(Registered) SGX for Dummies (Intel(Registered) SGX Design Objectives)", Retrieved from "https://software.intel.com/en-us/blogs/2013/09/26/protecting-application-secrets-with-intel-sgx" on Oct. 24, 2017, 6 pages.
Hoekstra, Matthew, "Intel(Registered) SGX for Dummies—Part 2", (Published Jun. 2, 2014), Retrieved from "https://software.intel.com/en-us/blogs/2014/06/02/intel-sgx-for-dummies-part-2" on Oct. 24, 2017, 5 pages.

(56) References Cited

OTHER PUBLICATIONS

Hoekstra, Matthew, "Intel(Registered) SGX for Dummies—Part 3", (Published Sep. 1, 2014) Retrieved from "https://software.intel.com/en-us/blogs/2014/09/01/intel-sgx-for-dummies-part-3" on Oct. 24, 2017, 6 pages.
Hoekstra et al.. "Intel(Registered) SGX for Dummies (Intel(Registered) SGX Design Objectives)". Intel Corporation, Sep. 26, 2013, 8 pages.
Intel (Registered) Software Guard Extensions Programming Reference, reference No. 329298-001 US, published Sep. 2013, pp. i to 7-10 (156 pages).
Intel, "Intel(Registered) Software Guard Extensions Programming Reference", Reference No. 329298-002US, Oct. 2014, pp. 186.
International Preliminary Report on Patentability for Application No. PCT/US2016/048361, Apr. 5, 2018, 9 pages.
International Search Report and Written Opinion received for PCT Patent Application No. PCT/US2016/048361, Dec. 5, 2016, 12 pages.
Linux, "Memory Mapping and DMA", Chapter 15, Memory Management in Linux, Jan. 21, 2005, 52 pages.
McKeen et al., "Intel (Registered) Software Guard Extensions (Intel (Registered) SGX) Support for Dynamic Memory Management Inside an Enclave," Proceedings of the Hardware and Architectural Support for Security and Privacy 2016 (HASP 2016), Seoul, Republic of Korea, Jun. 18, 2016, Article No. 10, pp. 1-9.
McKeen, et al., "Innovative Instructions and Software Model for Isolated Execution", Intel Corporation, 2013, 8 pages.
Non-Final Office Action, U.S. Appl. No. 16/882,637, Mar. 15, 2022, 6 pages.
Notice of Allowance, U.S. Appl. No. 14/866,478, Jan. 13, 2020, 11 pages.
Notice of Allowance, U.S. Appl. No. 16/882,637, Aug. 8, 2022, 5 pages.
Notice of Allowance, U.S. Appl. No. 16/882,637, Oct. 21, 2022, 2 pages.
Office Action and Search Report, TW App. No. 109129920, Dec. 27, 2022, 09 pages (05 pages of English Translation and 04 pages of Original Document).
Office Action, CN App. No. 201680055596.2, May 11, 2022, 7 pages of Original Document Only.
Office Action, TW App. No. 105125467, Dec. 18, 2019, 27 pages (13 pages of English Translation and 14 pages of Original Office Action).
Office Action, TW App. No. 109129920, Dec. 6, 2021, 24 pages (12 pages of English Translation and 12 pages of Original Document).
Office Action, TW App. No. 109129920, Feb. 2, 2021, 08 pages (4 pages of English Translation and 4 pages of Original Document).
Office Action, TW App. No. 109129920, Jul. 25, 2022, 26 pages (13 pages of English Translation and 13 pages of Original Document).
Whitehouse, Ollie, "Intel (Registered) Software Guard Extensions (SGX): A Researcher's Primer," nccgroup blog, Jan. 5, 2015 (downloaded from https://www.nccgroup.trust/uk/about-us/newsroom-and-events/blogs/2015/january/intel-software-guard-extensions-sgx-a-researchers-primer/on Apr. 13, 2017), 12 pages.
Office Action, DE App. No. 112016004330.9, Jul. 26, 2024 08 pages of Original Document only.

* cited by examiner

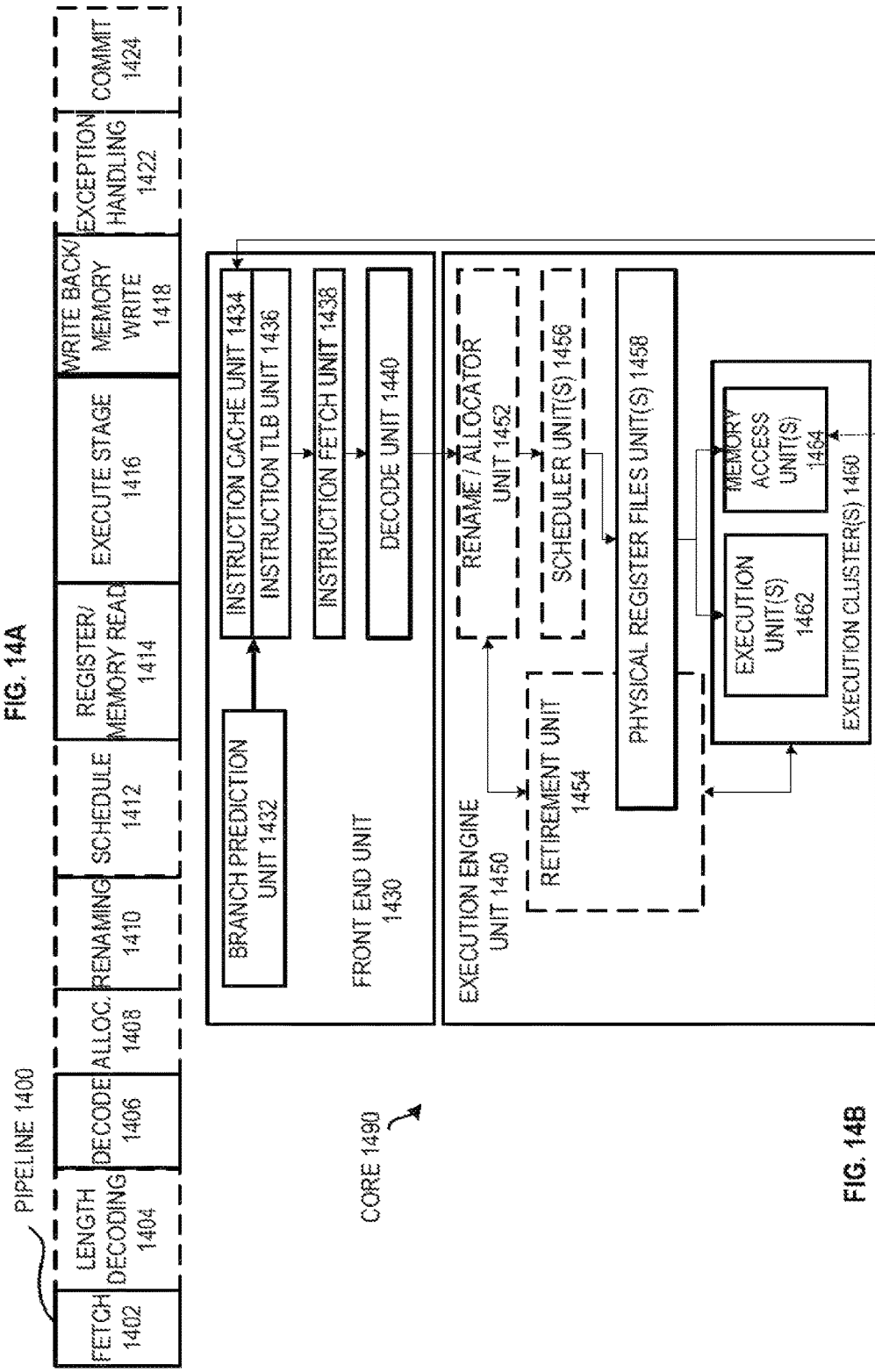
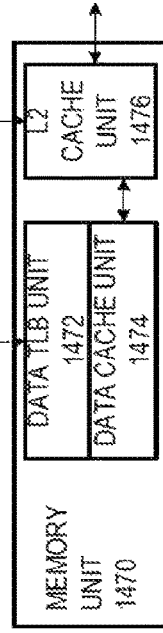
FIG. 14A
FIG. 14B

PROCESSORS, METHODS AND SYSTEMS TO ALLOW SECURE COMMUNICATIONS BETWEEN PROTECTED CONTAINER MEMORY AND INPUT/OUTPUT DEVICES

CROSS REFERENCE TO RELATED APPLICATIONS

The present application is a continuation of U.S. patent application Ser. No. 16/882,637, filed on May 25, 2020, entitled PROCESSORS, METHODS AND SYSTEMS TO ALLOW SECURE COMMUNICATIONS BETWEEN PROTECTED CONTAINER MEMORY AND INPUT/OUTPUT DEVICES, which is a continuation of U.S. patent application Ser. No. 14/866,478, filed on Sep. 25, 2015, entitled PROCESSORS, METHODS AND SYSTEMS TO ALLOW SECURE COMMUNICATIONS BETWEEN PROTECTED CONTAINER MEMORY AND INPUT/OUTPUT DEVICES, now U.S. Pat. No. 10,664,179, issued May 26, 2020, which is hereby incorporated herein by reference in its entirety and for all purposes.

BACKGROUND

Technical Field

Embodiments described herein generally relate to processors. In particular, embodiments described herein generally relate to securing information in processors.

Background Information

Desktop computers, laptop computers, smartphones, servers, and various other types of computer systems are often used to process secret or confidential information. Examples of such secret or confidential information include, but are not limited to, passwords, account information, financial information, information during financial transactions, confidential company data, enterprise rights management information, personal calendars, personal contacts, medical information, other personal information, and the like. It is generally desirable to protect such secret or confidential information from inspection, tampering, theft, and the like.

BRIEF DESCRIPTION OF THE DRAWINGS

The invention may best be understood by referring to the following description and accompanying drawings that are used to illustrate embodiments. In the drawings:

FIG. 14A is a block diagram illustrating an embodiment of an in-order pipeline and an embodiment of a register renaming out-of-order issue/execution pipeline.

FIG. 14B is a block diagram of an embodiment of processor core including a front end unit coupled to an execution engine unit and both coupled to a memory unit.

DETAILED DESCRIPTION OF EMBODIMENTS

Disclosed herein are processors, methods, systems, and instructions to allow secure communication between a protected container memory and an input and/or output device. In the following description, numerous specific details are set forth (e.g., specific processor configurations, microarchitectural details, instruction operations, sequences of operations, etc.). However, embodiments may be practiced without these specific details. In other instances, well-known circuits, structures and techniques have not been shown in detail to avoid obscuring the understanding of the description.

Figure 1:
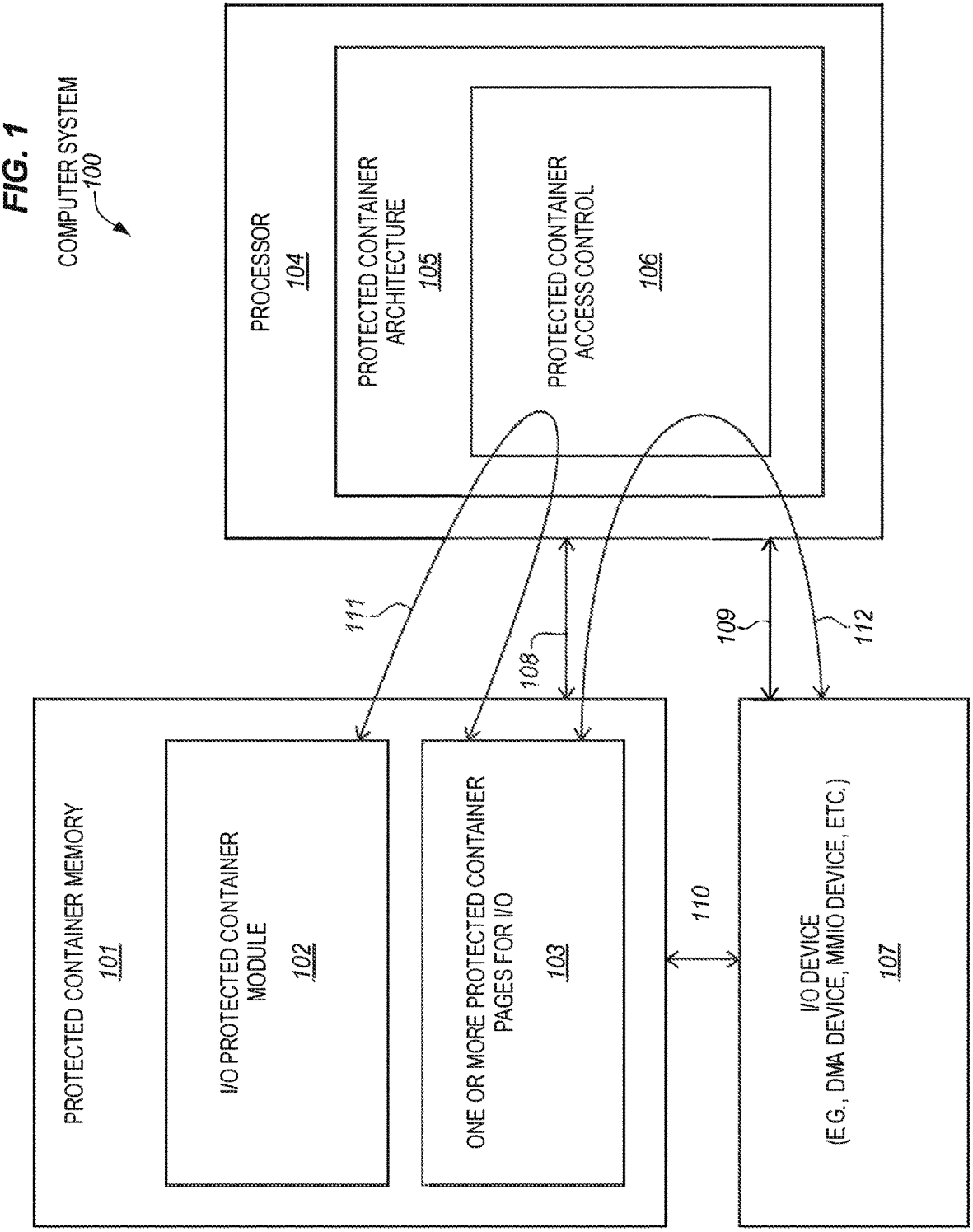
FIG. 1 is a block diagram of an embodiment of a computer system in which embodiments may be implemented.

FIG. 1 is a block diagram of an embodiment of a computer system 100 in which embodiments may be implemented. In various embodiments, the computer system may represent a desktop computer system, a laptop computer system, a tablet computer system, a smartphone, a server, network equipment, or the like, or various other types of computer systems commonly often used to process secret or confidential information.

The computer system includes a protected container memory 101, a processor 104, and an input and/or output (I/O) device 107. The protected container memory, the processor, and the I/O device are coupled with one another. As shown, the processor is coupled with the protected container memory by a first optional coupling mechanism 108, the protected container memory is coupled with the I/O device by a second optional coupling mechanism 110, and the processor is coupled with the I/O device by a third optional coupling mechanism 109. Examples of suitable coupling mechanisms include, but are not limited to, one or more buses or other interconnects, one or more chipset components, other mechanisms for coupling the processor, the memory, and the I/O device, and various combinations thereof.

The processor has a protected container architecture 105. The protected container architecture includes protected container access control logic 106. In some embodiments, the protected container architecture and/or the protected container access control logic may be operative to support and protect the protected container memory and/or one or more protected container modules thereof (e.g., one or more secure enclaves). In some embodiments, the protected container architecture and/or the protected container access control logic may be operative to support and/or protect and/or control access to the protected container memory and/or one or more protected container modules thereof using any one or more of the different approaches used in Intel® Software Guard Extensions (Intel® SGX) to support and/or protect and/or control access to an enclave page cache (EPC) and/or one or more secure enclaves thereof, although the scope of the invention is not so limited. In some embodiments, the protected container architecture and/or the protected container access control logic may be operative to support and/or protect and/or control access to the protected container memory and/or one or more protected container modules thereof using any one or more of the different approaches described below in conjunction with FIG. 2, although the scope of the invention is not so limited. In some embodiments, one or more other approaches for supporting and/or protecting and/or controlling access to the protected container memory and/or one or more protected container modules thereof may also and/or alternatively optionally be used.

In some embodiments, the processor may be a general-purpose processor (e.g., a general-purpose microprocessor or central processing unit (CPU) of the type commonly used in desktop, laptop, smartphone, and other computers), although the scope of the invention is not so limited. The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures) To avoid obscuring the description, a simplified example of the processor is shown, although it is to be appreciated that the processor may optionally have any of the components of the other processors shown and described herein.

Various different types of I/O devices are suitable for the I/O device 107. In some embodiments, the I/O device 107 may represent a direct memory access (DMA) device that the processor is able to configure to perform DMA. In some embodiments, the I/O device 107 may represent a memory-mapped I/O (MMIO) device that the processor is able to configure through MMIO. In some embodiments, the I/O device 107 may be both a DMA device and a MMIO device. Specific examples of suitable different types of devices for the I/O device 107 include, but are not limited to, DMA controllers, DMA engines, and various types of devices having at least one DMA controller and/or a DMA engine, keyboards, touch screens, fingerprint sensors or readers, eye iris scan devices and other biometric devices, disk drives and other storage controllers, Universal Serial Bus (USB) coupled devices, portable storage devices, flash drives, network cards, network controllers, and other network and communication devices, sound cards and other audio devices, cameras, video devices, and graphics cards and other graphics devices, Geographic Positioning System (GPS) and other location sensors, and the like, to name just a few examples.

As shown, in some embodiments, the protected container memory 101 may have an embodiment of an input and/or output (I/O) protected container module 102. In some embodiments, the protected container memory may also have one or more protected container pages that are configured for and/or otherwise operative to allow I/O access by the I/O device. In some embodiments, the I/O protected container module 102 and the I/O device 107 may perform I/O through the one or more protected container pages 103 that are configured or otherwise operative for I/O. As shown, the I/O protected container module 102 may access 111 (e.g., read from and/or write to) the one or more protected container pages 103. Similarly, the I/O device 107 may access 112 (e.g., read from and/or write to) the one or more protected container pages 103. In some embodiments, these accesses may be performed through the protected container architecture 105 and/or the protected container access control logic 106 which may be operative to allow these accesses. For example, in some embodiments, protected container architecture 105 and/or the protected container access control logic 106 may be operative to allow the I/O protected container module 102 and the I/O device 107 to perform DMA through the one or more protected container pages 103. As another example, in some embodiments, protected container architecture 105 and/or the protected container access control logic 106 may be operative to allow the I/O protected container module 102 and the I/O device 107 to perform MMIO through the one or more protected container pages 103.

Figure 2:
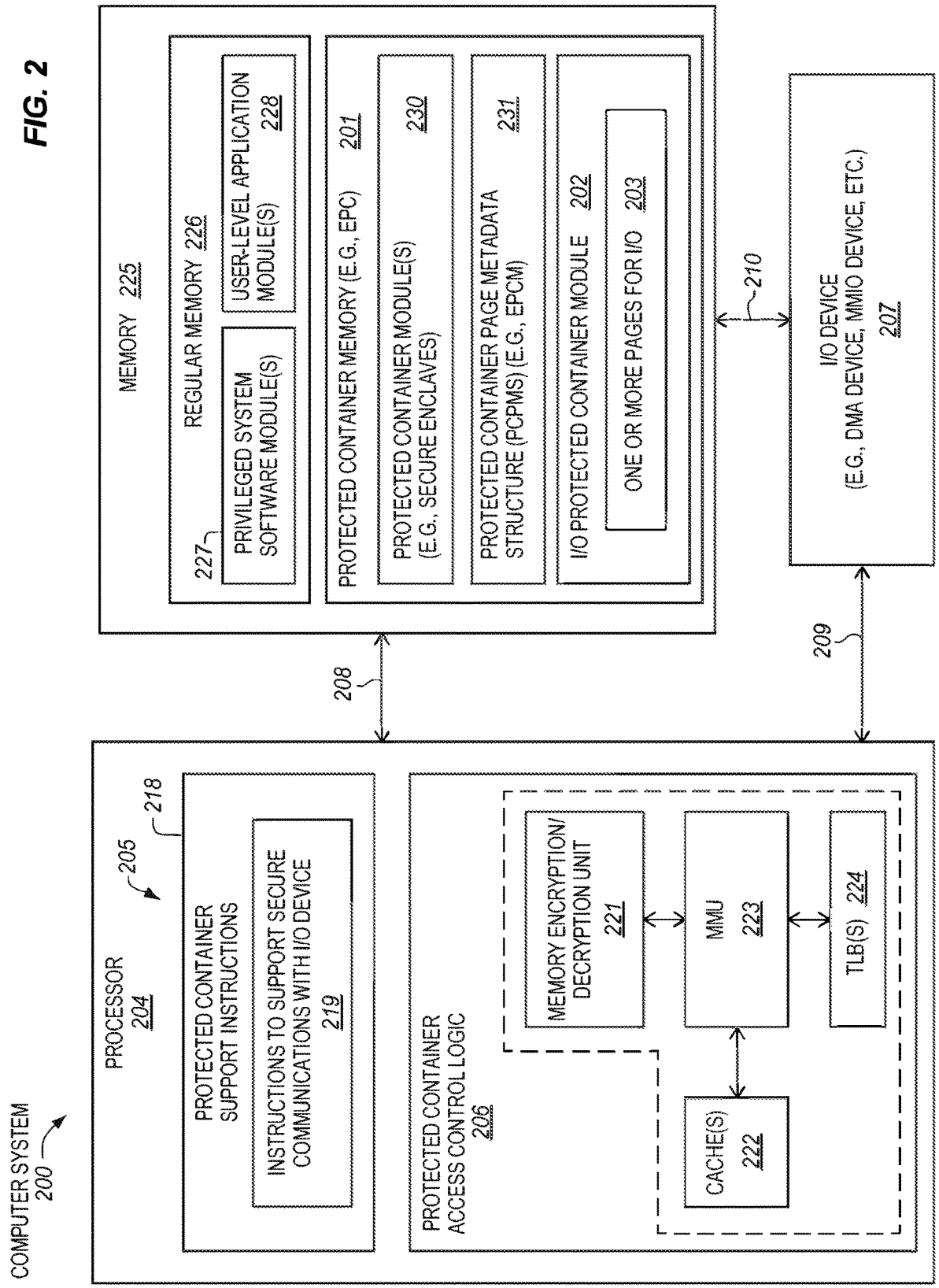
FIG. 2 is a block diagram of a detailed example embodiment of a computer system suitable for implementing embodiments of the invention.

FIG. 2 is a block diagram of a detailed example embodiment of a computer system 200 suitable for implementing embodiments of the invention. The computer system includes a processor 204, a memory 225, and an input and/or output (I/O) device 207. The processor, the memory, and the I/O device are coupled with one another. As shown, the processor is coupled with the memory by a first coupling mechanism 208, the processor is coupled with the I/O device by a second optional coupling mechanism 209, and the I/O device is coupled with the memory by a third optional coupling mechanism 210. Examples of suitable coupling mechanisms include, but are not limited to, one or more buses or other interconnects, one or more chipset components, other mechanisms for coupling the processor, the memory, and the I/O device, and various combinations thereof.

The processor 200 may be any of the various different types of processors described above as being suitable for the processor 100. In some embodiments, the processor 200 may have a protected container architecture 205 that is operative to provide and/or support one or more of a protected container module 230 and an I/O protected container module 202. Examples of suitable protected container modules include, but are not limited to, secure enclaves, isolated execution environments, isolated execution regions, and the like. By way of example, in some embodiments, the protected container architecture may include Intel® Software Guard Extensions (Intel® SGX), an extension or future version of Intel® SGX, a protected container architecture with at least some similar features to Intel® SGX, or other protected container architectures.

As shown, the protected container architecture 205 may include one or more protected container support instructions 218. These instructions when performed may be operative to cause the processor to support various aspects associated with the protected container modules. By way of example, in some embodiments, there may optionally be instructions to create protected container modules, destroy protected container modules, enter protected container modules, exit protected container modules, manage paging in protected container modules, perform security operations on protected container modules, measure protected container modules, otherwise support operations associated with protected container modules, or various combinations thereof. Certain of such instructions may be privileged-level instructions that are to be performed by privileged-level software but not by unprivileged user-level software. Other instructions may be unprivileged user-level instructions. These instructions may be instructions of an instruction set of the processor (e.g., at least one core thereof).

The protected container architecture 205 of the processor may also include protected container access control logic 206. The protected container access control logic may be operative to control access to the protected container modules (e.g., module 230 and/or 202). In various embodiments, the protected container access control logic may be distributed throughout various components of the processor, such as, for example, one or more caches 222, a memory management unit (MMU) 223, one or more translation lookaside buffers (TLBs) 224, architectural registers (not shown), one or more out-of-order execution related buffers (not shown), execution units (not shown), and various other on-die logic that is used to access the protected container memory, store contents of the protected container memory, process the contents of the protected container memory, etc. The protected container access control logic may be implemented in circuitry or other hardware, firmware (e.g., instructions stored in read only memory), software, or a combination thereof (e.g., at least some hardware, potentially combined with some firmware, and optionally potentially with some software). Different possible ways in which the protected container access control logic may control access to the protected container modules will be discussed further below.

The memory 225 may represent a main system memory. Physically, the memory may include one or more types of physical memory. Logically, the memory may be configured as both a regular memory 226 and a protected container memory 201. In some embodiments, the protected container memory may represent a dedicated or static portion of the overall memory configured to implement the protected container memory. By way of example, in some embodiments, the protected container memory may represent an Intel® SGX enclave page cache (EPC), although the scope of the invention is not so limited. In other embodiments, pages or other portions of the overall memory may be configured or converted dynamically (e.g., during runtime) to be either regular memory or protected container memory type pages or portions. By way of example, in some embodiments, the protected container memory may represent an Intel® SGX flexible enclave page cache (flexible EPC) in which pages may be converted between regular and protected container memory types of pages, although the scope of the invention is not so limited. In some embodiments, the processor may have one or more range registers that may be used to store one or more ranges to configure the portion of the overall memory used for the protected container memory. Representatively, a basic input/output system (BIOS) may store the ranges in the range registers during a boot process.

The regular memory 226 and the protected container memory 201 may have different levels of protection or security as provided by the protected container architecture 205 of the processor. Specifically, the regular memory may have a lower level of protection than the protected container memory. For example, the regular memory may have a level of protection similar to that conventionally used for memory that is used to store one or more privileged system software modules 227 (e.g., a virtual machine monitor (VMM) module, one or more operating system (OS) modules, etc.), and one or more user-level application modules 228 (e.g., a word processing application, spreadsheet, email application, Internet browser, etc.). In contrast, the protected container memory may have a higher level of protection than that conventionally used for storing such privileged system software modules, user-level application modules, user-level data, and the like. The higher level of protection may be enforced, controlled, or otherwise provided at least in part by the protected container access control logic 206 of the processor.

During operation, one or more protected container modules 230 may be stored in the protected container memory 201. By way of example, each of the protected container modules may include one or more pages of the protected container memory. Examples of suitable protected container modules, according to various embodiments, include but are not limited to, secure enclaves, isolated execution environments, isolated execution regions, and the like. By way of example, in some embodiments, the protected container modules may represent Intel® SGX secure enclaves, although the scope of the invention is not so limited. Each of the protected container modules may have one or more of code, data, stack, or other contents that the protected container architecture 205 and/or the protected container access control logic 206 of the processor may help to protect, even from the most highly privileged system-level software.

In some embodiments, a protected container page metadata structure (PCPMS) 231 may be used to store metadata for pages of the protected container memory 201. In one aspect, the PCPMS may be structured to have different entries or portions for different corresponding pages in the protected container memory, although other ways of structuring the PCPMS are also possible. Each entry may be used to store metadata for a corresponding page of the protected container memory. Examples of suitable types of metadata include, but are not limited to, security related metadata, access control metadata, and the like. Specific examples of suitable metadata includes, but is not limited to, information to indicate whether pages are valid or invalid, information to indicate protected container modules to which the protected container pages belong, information to indicate the virtual addresses through which the protected container pages are allowed to be accessed, information to indicate access permissions for the protected container pages (e.g., whether the pages are one or more of readable, writeable, or executable), and the like, and various combinations thereof, depending upon the particular implementation. Alternatively, less metadata, more metadata, or different metadata may optionally be used. In addition, in other embodiments, metadata may optionally be stored in two or more different data structures. One example of a suitable PCPMS is an Intel® SGX enclave page cache map (EPCM), although the scope of the invention is not so limited. In other embodiments, the PCPMS may store less, more, or different types of data than typically stored in an EPCM. At least some of the metadata stored in the PCPMS may represent controls that processor access control logic is to use to control access to protected container memory pages.

As shown in FIG. 2, the protected container module(s) 230, 202 and the PCPMS 231 may optionally be stored in the protected container memory 201 (e.g., as one or more pages thereof). In addition, or alternatively, contents of the protected container module(s) and/or the PCPMS may optionally be stored in an on-die storage of the processor 204. As one example, one or more caches 222 of the processor may be used to store the protected container pages and/or the PCPMS. Either dedicated portions of one or more existing caches may be used, or one or more dedicated caches may be used, or a combination of such approaches may be used. As another option, the processor may optionally have another type of storage besides caches, such as, for example, a dedicated on-die storage, to store the contents of the protected container module and/or the PCPMS.

Different types of security features may be used to protect the protected container module(s) (e.g., module 230 and/or 202) in different embodiments. In some embodiments, the protected container architecture 205 may provide confidentiality protections to contents (e.g., code and/or data and/or stack) of the protected container modules. Maintaining confidentiality generally involves preventing disclosure of the contents. In some embodiments, the protected container access control logic 206 may be operative to control access to the protected container memory 201. In some embodiments, the protected container access control logic may be operative to control access to the contents of the protected container memory, not only when such contents are stored in the protected container memory, but also when these contents are temporarily resident on-die within the processor during runtime (e.g., stored in caches, registers, buffers or other storage, or conveyed over buses, or being processed by various other structures or units, etc.). Commonly, these contents may be in an unencrypted format when they are resident on-die, which would tend to render them more vulnerable for inspection if such on-die access controls were not provided.

In some embodiments, the protected container access control logic 206 may be operative to only allow authorized accesses to the contents of a given protected container module from code contained within the same given protected container module, and may be operative to prevent unauthorized accesses to the contents of the given protected container module from code not contained within the same given protected container module (e.g., code belonging to a different protected container module, code belonging to the regular memory (e.g., code belonging to the privileged system software module(s) 227), etc.). In some embodiments, such protected container module contents may be protected in this way both when stored in the protected container memory, as well as when temporarily resident, in a potentially unencrypted format, in caches, registers, and various other types of structures within the processor. In some embodiments, such contents may be protected in this way even when the code attempting to access the contents of the protected container module belongs to even the most highly privileged system-level software (e.g., an OS, VMM, BIOS, etc.). In some embodiments, a privileged system-level software module may be used to manage various aspects of the protected container memory and/or protected container modules, for example to allocate pages to the protected container memory and/or protected container modules and/or manage virtual memory for the protected container memory and/or protected container modules, but the protected container modules may be opaque to even the most highly privileged system-level software modules. That is, even though the privileged system software modules may manage certain aspects of the protected container memory and/or protected container modules, they may not be able to read from and/or write to the contents of the protected container modules. Advantageously, this may help to maintain confidentiality and data integrity even in the presence of highly-privileged malware.

In some embodiments, to further provide confidentiality protections, the processor 204 may inherently, autonomously, and/or transparently to software, store protected container module contents encrypted from the processor into the protected container memory 201. However, by contrast the processor may not inherently, autonomously, and/or transparently to software (e.g., without needing to execute an encryption routine), store contents encrypted from the processor into the regular memory 226. For example, in some embodiments, all stores from the processor to the protected container memory (e.g., due to performing store to memory instructions with addresses mapped to the protected container memory, due to performing cache evictions of cache lines having contents of the protected container memory, etc.) may automatically be performed through a memory encryption and decryption unit 221 of the processor. The memory encryption and decryption unit may be used to inherently, autonomously, and/or transparently to software encrypt the data before it is stored in the protected container memory, which may help to provide confidentiality to the data. Moreover, in some embodiments, all reads into the processor from the protected container memory (e.g., due to performing load from memory instructions with addresses mapped to the protected container memory) may be inherently, autonomously, and/or transparently to software decrypted with the memory encryption and decryption unit. However, accesses to data in the regular memory may not be performed through the memory encryption and decryption unit and may not be performed with such automatic encryption/decryption.

In some embodiments, the protected container architecture 205 may optionally provide integrity protections to contents of the protected container modules (e.g., module 230 and/or module 202 and/or the one or more pages 203). Maintaining integrity generally involves preventing tampering of the contents. Integrity protection is sometimes also referred to as authentication. In some embodiments, the processor may optionally inherently, autonomously, and/or transparently to software, provide cryptographic integrity protection to the contents of the protected container memory. However, by contrast the processor may not inherently, autonomously, and/or transparently to software (e.g., without needing to execute a software routine), provide such cryptographic integrity protection to the contents of the regular memory. For example, in some embodiments, the memory encryption and decryption unit 221 may optionally be operative to compute a message authentication code (MAC), other authentication code, or other integrity check data, for contents of the protected container memory, before the contents are stored from the processor to the memory. Subsequently, when the contents of the protected container memory are received into the processor, the memory encryption and decryption unit may also optionally be operative to use the integrity check data to authenticate or check the integrity of the contents before the contents are allowed to be used. The processor may optionally include logic to prevent access to contents if the authentication or integrity checks fail.

In some embodiments, the protected container architecture 205 may optionally include logic to generate and use version information associated with contents of the protected container memory 201 (e.g., one or more pages of module 230, one or more pages of module 202, the one or more pages 203 I/O, etc.). For example, pages of the protected container memory may optionally be assigned version information (e.g., a unique version counter value) when they are stored from the processor to the protected container memory. Subsequently, when the contents of the protected container memory are received back into the processor, the processor may optionally review such version information. In some embodiments, the processor may only allow protected container memory contents indicated to be legitimate or valid by the version information (e.g., only the last evicted version) to be loaded. This may optionally be used to help to prevent replay of protected container code and/or data.

To further illustrate certain concepts, examples of possible types of protections, which may optionally be used in some embodiments to protect or secure protected container modules, have been described. However, it is to be appreciated that the types and levels of protection may vary from one implementation to another, depending upon the particular implementation, need for security, cost or complexity versus security tradeoffs, and the like. Embodiments disclosed herein may be used with protected container modules of varying types and levels of protection. Accordingly, while the aforementioned protection mechanisms, and various combinations thereof, are suitable for embodiments and may optionally be used in some embodiments, the scope of the invention is not limited to any known type of protection mechanism and/or level of protection to be used to secure I/O as described herein.

Referring again to FIG. 2, the computer system also has the I/O device 207. In some embodiments, the I/O device may be a DMA device. In some embodiments, the I/O device may be an MMIO device. In some embodiments, the I/O device may be both a DMA device and an MMIO device. Any of the various types of devices mentioned above for the I/O device 107 are suitable.

Conventionally, protected container architectures (e.g., such as the protected container architecture 205) generally do not permit secure communication between the protected container memory 201 and the I/O device 207. As a result, the protected container memory and/or one or more protected container modules thereof may not be able to exchange secure I/O data between the protected container memory and the I/O device (e.g., write contents from within the protected container memory to the I/O device and/or read data from the I/O device into the protected container memory) without such exchanges or data being potentially vulnerable to inspection and/or tampering.

Referring again to FIG. 2, the protected container memory 201 may have an embodiment of an I/O protected container module 202. As shown, in some embodiments, the I/O protected container module may be stored in the protected container memory. As further shown, in some embodiments, the I/O protected container module may have, or at least may be able to access, one or more protected container pages 203 that are configured for and/or otherwise operative for secure I/O.

In some embodiments, the protected container access control logic 206 of the processor may be operative to allow the I/O protected container module and the I/O device to engage in secure I/O. In some embodiments, the secure I/O may be secure DMA. In some embodiments, the secure I/O may be secure MMIO. In some embodiments, such secure I/O may be performed through the one or more pages 203, or at least through one or more pages or another portion of the protected container memory 201 that is configured for and/or otherwise operative for such secure I/O between the I/O protected container module and the I/O device. In some embodiments, by performing the secure I/O through the one or more pages 203, or at least through a portion of the protected container memory, the protected container access control logic 206 of the processor may be operative to leverage and/or extend at least some existing protection mechanisms associated with protecting the protected container memory to help secure or protect such I/O with the I/O device.

Figure 3:
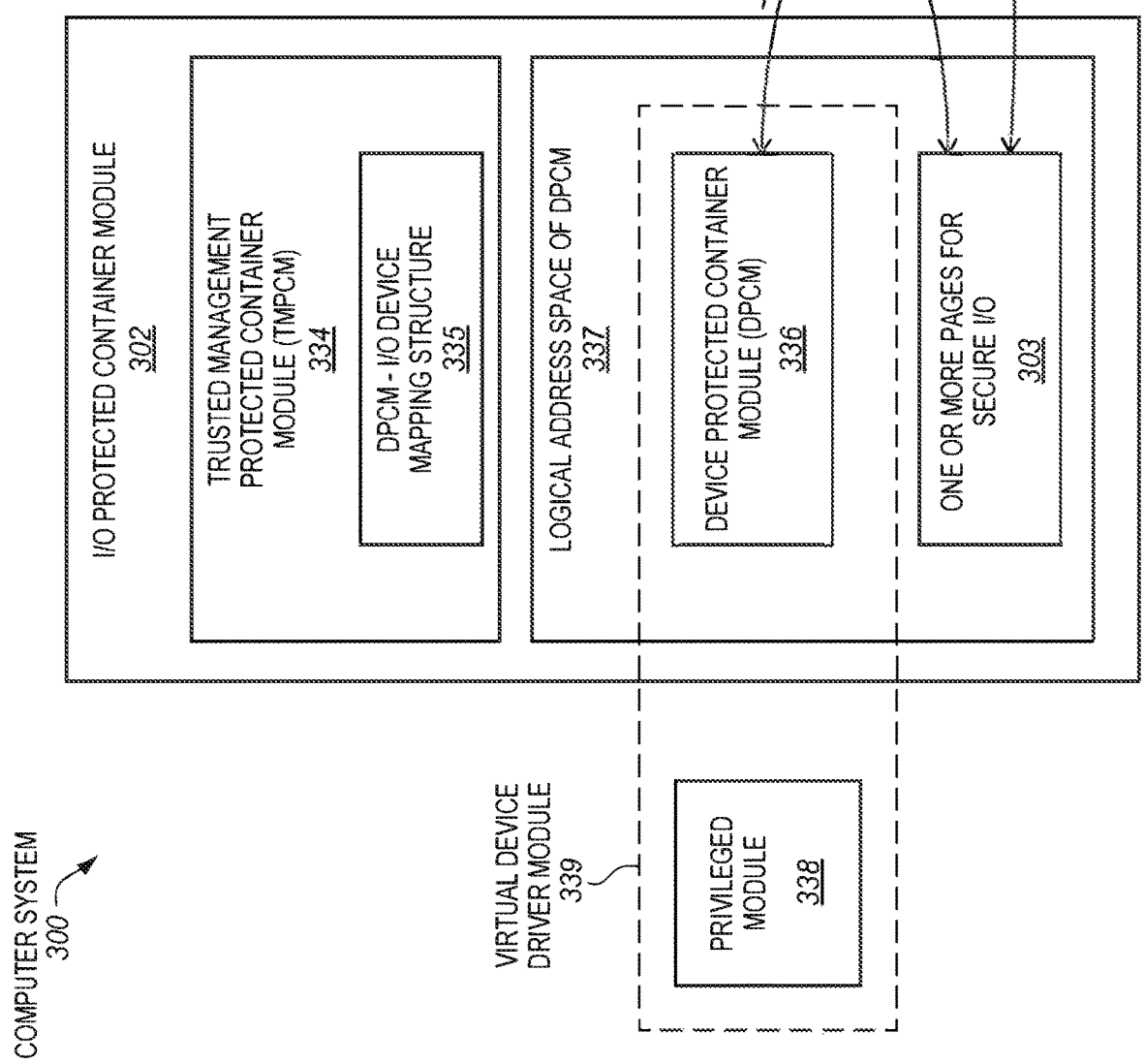
FIG. 3 is a block diagram of an embodiment of a computer system having an example embodiment of an I/O protected container module.

FIG. 3 is a block diagram of an example embodiment of a computer system 300 having an example embodiment of an I/O protected container module 302. As shown, in some embodiments, the I/O protected container module may be logically divided into a first module labeled as a trusted management protected container module (TMPCM) 334 and a second module labeled as a device protected container module (DPCM) 336, although this is not required.

The DPCM 336 may be operative to communicate with the I/O device 307. Representatively, in some embodiments, the DPCM may include at least some code or other logic similar to that commonly found in a device driver module to allow the DPCM to communicate with the I/O device. However, the DPCM may be implemented at a user-level of privilege, rather than at a privilege level which is often used to implement device drivers. This may help to allow user-level applications to use the DPCM to perform secure I/O. In some embodiments, the DPCM may optionally be device-type specific such that it is only operative to communicate with a particular type of I/O device. Alternatively, the DPCM may optionally be operative to communication with two or more different types of I/O devices.

However, a privileged module 338 may optionally include certain other types of code or other logic associated with communicating with the I/O device 307. For example, certain other types of code or other logic generally more appropriate for a higher privilege level than user-level privilege may optionally be apportioned to the privileged module. For example, the privileged module may include code or logic operative to handle interrupt, exceptions, or the like which may occur during the secure I/O. In some embodiments, the DPCM and a privileged module may cooperate or work together to implement a distributed hybrid user and privileged virtual device driver module 339.

In some embodiments, the TMPCM 334 may have more rights or privileges than the DPCM 336. By way of example, in an Intel® SGX implementation, the TMPCM may optionally be implemented as an Architectural Device Enclave (ADE), which may have special privileges beyond those available to regular secure enclaves, although the scope of the invention is not so limited. In some embodiments, the TMPCM may be operative to mediate or interface between the I/O device 307 and protected container access control logic 306 of a processor.

In some embodiments, the TMPCM 334 may be operative to selectively assign and/or revoke ownership or other right of use of the I/O device 307 to the DPCM 336. For example, in some embodiments, the TMPCM may maintain a DPCM to I/O device mapping structure 335, such as a table or other data structure, which assigns or otherwise maps ownership or other right of use of the I/O device to the DPCM. In implementations, where more than one I/O device is to be used for secure I/O and/or when more than one DPCM is to be used for secure I/O, the DPCM to I/O device mapping structure may similarly map these other DPCMs to these other I/O devices.

In some embodiments, one or more pages 303 configured or otherwise operative for secure I/O may be used by the DPCM and the I/O device to implement the secure I/O. In some embodiments, these page(s) may be in a linear, virtual, or other logical address space 337 of the DPCM. This may potentially help to leverage certain access rights monitoring and control by the protected container access control logic 306, although this is not required.

In some embodiments, the one or more pages 303 may be of a new page type reserved for I/O and/or a particular type of I/O (e.g., only for DMA, only for MMIO, etc.). The use of a new page type may represent one or more bits in an EPCM or other protected container page metadata structure (PCPMS) indicating that the page(s) are of the new type, and associated new or different access controls associated with the pages. Different examples of suitable types of access controls suitable for these new page types will be discussed further below.

In some embodiments, only a single DPCM may have ownership of, or other right to use, the I/O device 307 at a single time. In some embodiments, the protected container access control logic 306 of the processor may be operative to use information representative of such ownership of, or other right to use, the I/O device by the DPCM to determine whether or not to allow an I/O attempt by either the DPCM and/or the I/O device. That is, the ability to use the secure I/O may be conditioned on one or more checks that the DPCM has a right to perform secure I/O with the I/O device and/or that the I/O device has a right to perform secure I/O with the DPCM.

As shown, in some embodiments, attempted accesses by the I/O device to the one or more pages 303 configured or otherwise operative for secure I/O may include or use an associated device identifier (e.g., Security Attributes of Initiator (SAI)) 340. Similarly, in some embodiments, attempted accesses by the DPCM to the one or more pages 303 may include or use an associated DPCM identifier (e.g., a secure enclave identifier) 341. Alternatively, other forms of information sufficient to allow the protected container access control logic of the processor to ascertain whether the attempted accesses should be allowed may optionally be used instead.

As mentioned above, in some embodiments, the secure I/O may include secure DMA. DMA is an approach that is commonly used to offload data transfers to and/or from memory (e.g., main system memory) from the processor (e.g., a CPU). Without DMA, the processor generally would need to be much more heavily involved in performing such data transfers. For example, without DMA, the processor may use programmed input/output by executing instructions in order to achieve these data transfers. This would tend to occupy the processor throughout the data transfers thereby making it generally less available to perform other types of work.

However, with DMA the processor may offload such data transfers to a DMA device (e.g., a DMA controller, DMA engine, device having a DMA controller or engine, etc.). Initially, the processor may program the DMA device to perform the data transfers. By way of example, the processor may program one or more registers of the DMA capable device (e.g., using MMIO) in order to specify a memory address that is to be used for the transfer, an amount of data that is to be transferred (e.g., the number of words to transfer), a direction of the transfer (e.g., whether a read or write is to be performed), and optionally other details about the data transfer (e.g., a port that is to be used, how much data to transfer in a burst, etc.).

The programmed DMA device may then directly access the memory and perform read and/or write operations to perform the programmed data transfers substantially without further involvement of the processor. The data transfers may take place between the memory and the DMA device and/or from one memory location to another. Typically, once the data transfers have been programmed and initialized, the processor does not need to execute additional instructions associated with performing the data transfers. This may tend to free the processor and allow it to perform other work while the data transfers take place. Once the DMA operations have been completed, the DMA device may provide an interrupt to the processor or otherwise signal the processor that the DMA transfers have been completed.

In some embodiments, a protected container architecture of a processor and/or protected container access control logic of the processor may allow secure DMA in which secure or protected bidirectional communications are performed between a DPCM and a DMA device. Initially, a secure DMA configuration phase may be performed in which the DPCM and the DMA device are mapped to one another and configured to allow secure DMA to be performed, then a DMA specification phase may be performed in which the particular secure DMA operations to be performed are specified, and finally a secure DMA implementation phase may be performed in which the specified secure DMA operations are performed.

Figure 4:
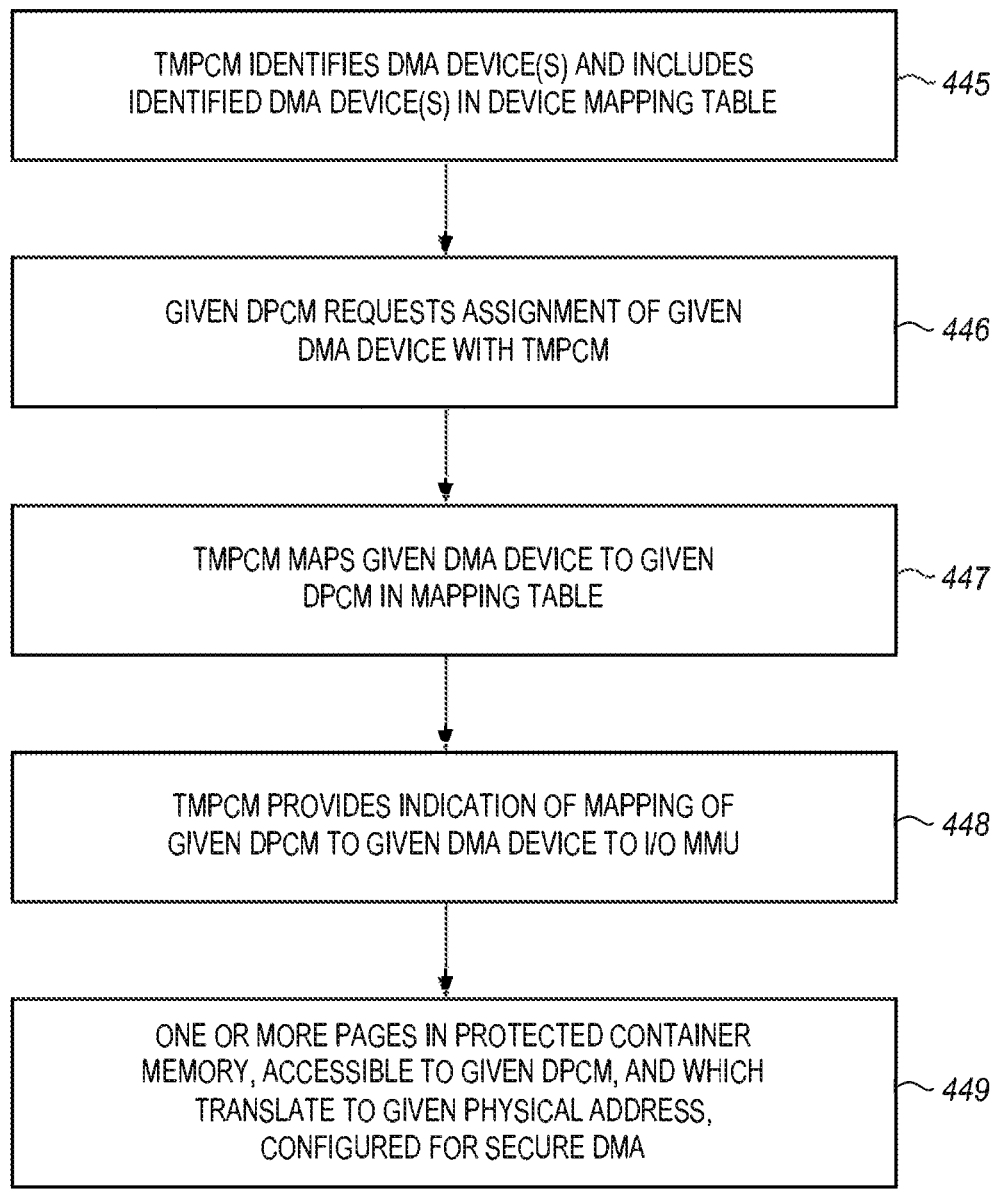
FIG. 4 is a block flow diagram of an example embodiment of a method of configuring secure direct memory access (DMA).
Figure 5:
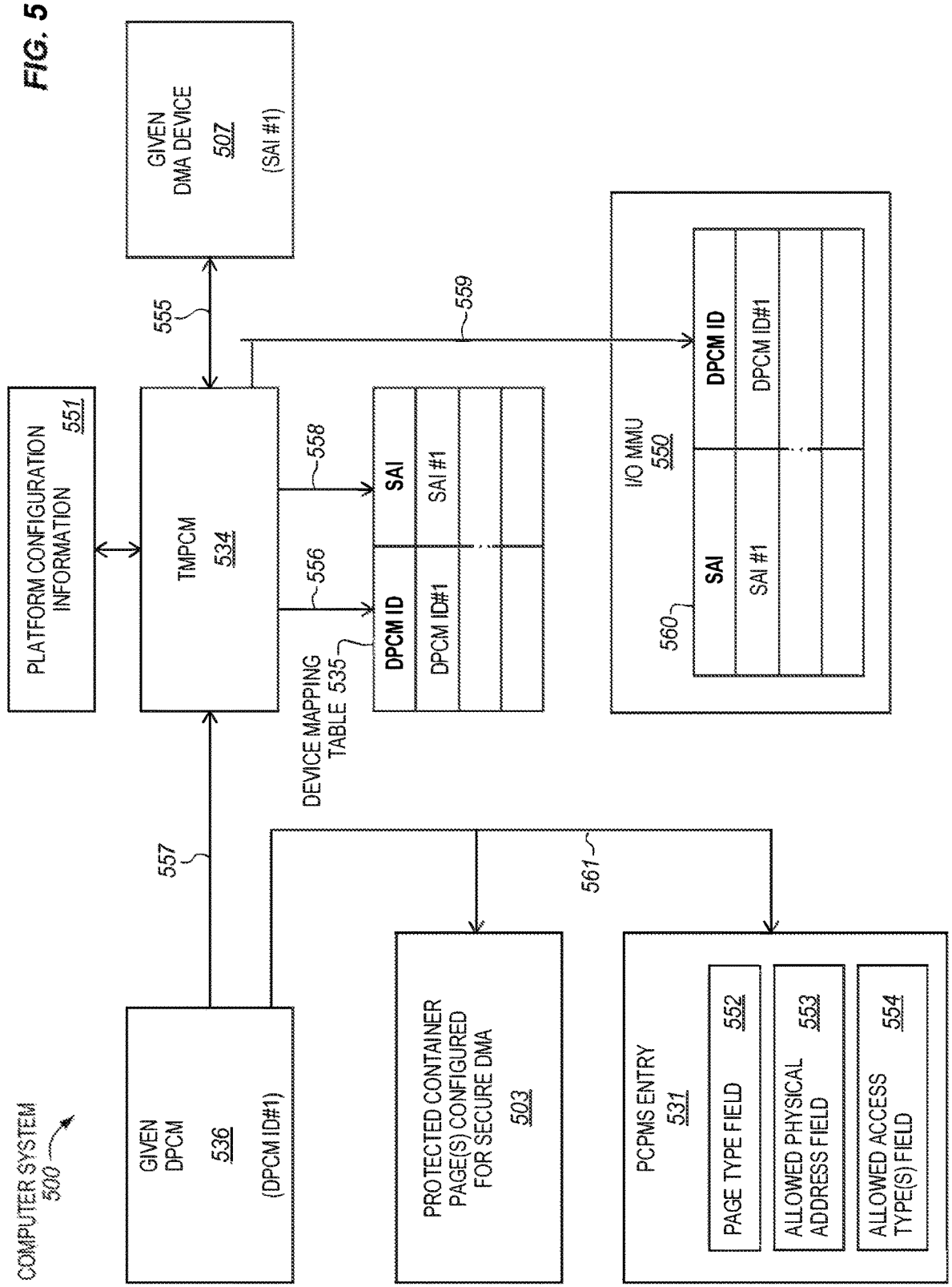
FIG. 5 is a block diagram of an example embodiment of a computer system showing a secure DMA configuration phase.

FIG. 4 is a block flow diagram of a detailed example embodiment of a method 444 of secure DMA configuration in which a DPCM and a DMA device are mapped to one another and configured to allow secure DMA to be performed. FIG. 5 is a block diagram of a detailed example embodiment of a computer system 500 and showing a secure DMA configuration phase in which a given DPCM 536 and a given DMA device 507 are mapped to one another and configured to allow secure DMA to be performed. To streamline the description, the method 444 will be described in conjunction with the computer system 500. However, it is to be appreciated that the method 444 may optionally instead be performed by different computer systems and/or that the computer system 500 may optionally instead perform different methods.

Referring to FIG. 4, at block 445, a TMPCM may enumerate or otherwise identify one or more DMA devices including a given DMA device in a computer system, and may include the identified DMA devices in a device mapping table. As shown in FIG. 5, a TMPCM 534 may identify 555 a given DMA device 507, and access 556 a device mapping table 535 to update it to list or otherwise include the given DMA device.

Different ways of identifying the DMA devices are possible. In some embodiments, the DMA devices identified may be trusted DMA devices, and the TPMCM may use a set of platform configuration information 551. In one aspect, the platform configuration information may represent trusted platform configuration information about the computer system that has been provided or possibly authenticated by a platform manufacturer or other trusted entity and may potentially be updated after use through a network. By way of example, the platform configuration information may describe in part which devices of the computer system (e.g., potentially which types of devices and from which vendors) are considered trusted and support trusted DMA.

Although for convenience the device mapping table is referred to as a "table," this term is used broadly herein to refer to any of various different types of tables, linked lists, tuples, or other data structures, which may be used to assign or otherwise map the given DMA device to the given DPCM. In some embodiments, each of the identified DMA devices may have, and may be identified by, a corresponding device identifier. Examples of suitable device identifiers include, but are not limited to, a Security Attributes of Initiator (SAI). The SAI or other device identifier may be used by hardware or other logic of the processor (e.g., the processor 104, 204, a processor having logic 306) to identify the associated I/O device (e.g., in this case a DMA device) when that device attempts to perform a memory access, makes a request, etc. One possible advantage of SAI, is that their generation generally tends to be difficult to fake, which may help to make it difficult for non-trusted devices to fake their generation. As shown in FIG. 5, the TMPCM may store an SAI #1 (or other type of device identifier) corresponding to the identified given DMA device 507 in the device mapping table 535.

Referring again to FIG. 4, at block 446, a given DPCM may request ownership or other assignment of a given one of the identified DMA devices with the TMPCM. For example, the DPCM may transmit a message to the TMPCM or otherwise signal the TMPCM about this request. Referring now to FIG. 5, the given DPCM may send a message, signal, or other request 557 to the TMPCM 534 to request that the given DMA device 507 be mapped to the given DPCM 536.

Referring again to FIG. 4, at block 447, the TMPCM may assign or otherwise map the given DMA device to the given DPCM in the device mapping table. As shown in FIG. 5, the TMPCM 534 may map 558 the given DMA device 507 to the given DPCM 536 in the device mapping table 535. For example, the TMPCM may store a device protected container module identifier (DPCMID #1) corresponding to the given DPCM in an entry of the device mapping table 535 that has an SAI #1 or other device identifier corresponding to the given DMA device. One example of a suitable DPCID, in an Intel® SGX implementation, is an enclave identifier (EID), although the scope of the invention is not so limited. This map effectively maps the given DPCM to the given DMA device.

Referring again to FIG. 4, at block 448, the TMPCM may provide an indication of the assignment or mapping of the given DMA device to the given DPCM to an I/O memory management unit (MMU). As shown in FIG. 5, the TMPCM 534 may signal or provide 559 an indication of the mapping of the given DMA device 507 to the given DPCM 536 to an I/O MMU 550. By way of example, the TMPCM and/or the I/O MMU may update an entry of an I/O MMU mapping table 560 belonging to, or at least accessible to, the I/O MMU that has the SAI #1 or other identifier of the given DMA device to include the DPCMID #1 or other DPCM identifier of the given DPCM in order to indicate the assignment or mapping. This may effectively inform the I/O MMU that the given DPCM corresponds to, and is allowed to perform secure DMA with, the given DMA device. In some embodiments, all memory accesses by the given DMA device may be handled as a part of the virtual to physical address translation mechanism by the I/O MMU. This may allow the I/O MMU to be aware of secure DMA so that it may selectively allow properly configured pairs of DMA devices and DPCMs to perform secure DMA without allowing other DMA devices and protected containers to perform secure DMA and/or without allowing other DMA devices not so properly configured to access the protected container memory. In some embodiments, the I/O MMU may be within the processor (e.g., processor 104 and/or 204) or at least one of a same chip or die as the processor, to help ensure that it is trusted. Examples of suitable I/O MMU for embodiments include, but are not limited to, a general purpose I/O MMU such as that commonly used for access control to peripheral devices (e.g., south-bridge attached devices), and graphics MMU's such as those commonly used for access control to graphics devices.

Referring again to FIG. 4, at block 449, one or more pages in a protected container memory, which are optionally within the logical address space (e.g., a linear, virtual, or other logical address space) of the given DPCM, or at least are accessible to the given DPCM, and which translate to a given physical address (e.g., a guest physical address), are configured to allow for secure DMA. Since the protected container page(s) are within the logical address space of the given DPCM and/or are at least are accessible to the given DPCM, protected container memory access control policies and logic used for other protected container memory accesses may potentially be leveraged to control access to the protected container page(s) for secure DMA (e.g., to ensure that the attempted access is made in protected container mode, is from the proper DPCM, has proper access type permissions, etc.).

In some embodiments, the protected container page(s) may optionally be allocated exclusively to the given DPCM and may therefore optionally be used to assign or map the given DMA device exclusively to the given DPCM. Alternatively, an exclusive mapping criteria may optionally not be enforced in other embodiments. Rather, some I/O devices may be mapped to different device protected container modules. As an example, a Universal Serial Bus (USB) controller may have different functions that may be mapped, for either MMIO or DMA, to different DPCMs. An another example, under certain conditions, a given function of an I/O device may be mapped to different DPCMs based on an additional identifier, such as, for example, a virtual local area network (VLAN) for a network controller. As shown in FIG. 5, the given DPCM 536 may at least partially configure one or more protected container pages 503 for secure DMA.

The protected container page(s) may be configured for secure DMA in different ways in different embodiments. In some embodiments, the given DPCM may request that a privileged system-level software module allocate a protected container memory page to a given logical address (e.g., a given linear address) optionally in the logical address space of the given DPCM or otherwise accessible to the given DPCM. For example, the privileged system-level software module may be generally responsible for managing memory virtualization. The privileged system-level software module may allocate and map the protected container memory page for the given logical address, and may return a corresponding physical address (e.g., a guest physical address (GPA)) to the DPCM. As will be explained further below (e.g., in conjunction with FIG. 7), the GPA may be used by the DPCM to configure the DMA communication. The physical addresses (e.g., the GPA) may be used instead of a linear, virtual, or other logical address in part because DMA devices (e.g., the given DMA device) may not be sufficiently aware of memory virtualization to readily use logical addresses. Alternatively, if an unused page accessible to the given DPCM and with an appropriate physical address is already available, it may potentially be repurposed for secure DMA without needing to have the privileged system-level software module allocate a new page. Other approaches are also contemplated and will be apparent to those skilled in the art and having the benefit of the present disclosure.

In some embodiments, one or more security checks or determinations may optionally be performed, before configuring the protected container page(s) for secure DMA. For example, in one embodiment, a check or determination may be made whether the protected container page(s) to be configured for secure DMA resolve to protected container memory page(s) that are accessible to the given DPCM. Alternatively, one or more additional and/or different security checks or determinations may optionally be performed before configuring the protected container page(s) for secure DMA. If any such checks or determinations fail, then the protected container page(s) may not be configured for secure DMA. Conversely, if such checks or determinations succeed, then the protected container page(s) may be configured for secure DMA.

The protected container page(s) may be configured for secure DMA in different ways in different embodiments. In some embodiments, in order to configure the protected container page(s) for secure DMA, a type of the protected container page(s) may be changed to be a new dedicated type of page for which secure DMA is allowed. In one aspect, this new type of page may optionally be dedicated specifically to secure DMA. In some embodiments, the type of the protected container memory page may be changed by changing metadata for the protected container page(s), such as, for example, by changing a page type field of a corresponding entry in a PCPMS or other data structure. For example, in an Intel® SGX implementation, this may include changing an EPCM.PT field of an EPCM to have a new value assigned to the secure DMA capable protected container memory page type. In contrast to conventional types of protected container memory pages, this new type of page may have access controls that permit secure DMA. For example, this new type of page may be accessible for DMA from a properly mapped or assigned DMA device. By way of example, the protected container access control logic of the processor and/or an I/O MMU may permit the properly mapped or assigned DMA device to access (e.g., read from and/or write to) this new type of page. In contrast, the DMA device may not be permitted by the protected container access control logic of the processor and/or an I/O MMU to access other types of pages in the protected container memory.

In some embodiments, in order to configure the protected container page(s) for secure DMA, a physical address (e.g., a guest physical address) that is allowed to be used to access the protected container page(s) for secure DMA may be configured. The physical address (e.g., the guest physical address) may have been previously determined for the protected container page(s) by a privileged system-level software module. In some embodiments, the allowed physical address may be configured by changing metadata for the protected container page(s), such as, for example, by changing an allowed physical address access field of a corresponding entry in a PCPMS or other data structure.

In some embodiments, in order to configure the protected container page(s) for secure DMA, one or more allowed access types may optionally be configured for the at least one protected container memory page. Examples of different access types that may or may not be configured for the at least one protected container memory page include, but are not limited to, a read (R) allowed access type, a write (W) allowed access type, and a read and write (RW) allowed access type. Configuring such access types is optional not required. In other embodiments, only certain types of access types may optionally be allowed by default, or all access types may optionally be allowed by default.

Referring again to FIG. 5, as shown at 561 the given DPCM 536 may configure or at least initiate configuring the protected container page(s) 503 for secure DMA by changing metadata for each page in a corresponding PCPMS entry 531. For example, this may include configuring a page type field 552 to have a page type that allows for secure DMA, configuring an allowed physical address field 553 to have a physical address (e.g., a guest physical address) through which the page is allowed to be accessed, and configuring an allowed access type(s) field 554 to allow one or more different types of access (e.g., read, write, read and write, etc.). Alternatively, the page need not strictly have a new type to be stored to the page type field, but rather an existing type of page and/or a page used for other purposes may optionally be qualified as being a page that allows for secure DMA. For example, the same type of page stored in the page type field may be used both for pages that allow for secure DMA and for pages that do not allow for secure DMA and there may be other metadata stored somewhere (e.g., another "qualification" field in the PCPMS entry) to qualify or indicate that secure DMA is allowed for the page without the page necessarily having to have a page type that allows for secure DMA or is dedicated specifically to allowing for secure DMA. The allowed physical address may subsequently be checked prior to performing secure DMA (e.g., as described in conjunction with FIGS. 8-9). Alternatively, instead of such configuration being done only in the PCPMS, two or more structures may be used to store this and/or additional and/or different metadata or configuration information for the protected container page(s) 503.

Figure 6:
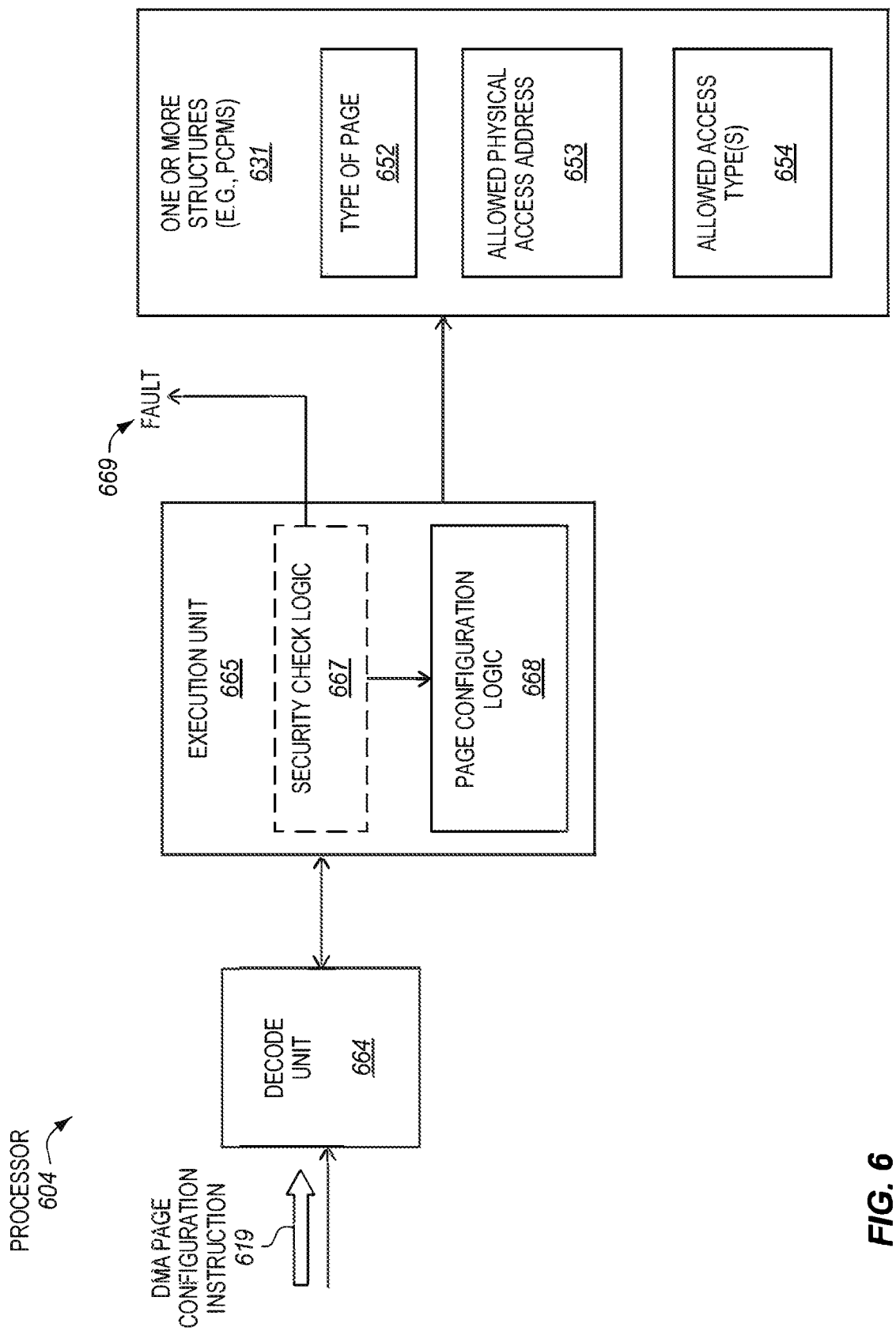
FIG. 6 is a block diagram of an embodiment of a processor that is operative to perform a DMA protected container page configuration instruction.

FIG. 6 is a block diagram of an embodiment of a processor 604 that is operative to perform an exemplary DMA protected container page configuration instruction 619. In some embodiments, the processor may be, or may be included in, the processor 104 of FIG. 1 and/or the processor 204 of FIG. 2. The components, features, and specific optional details described herein for the processors 104 and 204 also optionally apply to the processor 604. Alternatively, the processor 604 may optionally be included in similar or different processors than the processors 104 and 204. Moreover, the processors 104 and 204 may include similar or different processors than the processor 604.

The processor 604 includes a decode unit 664 that may receive and decode the DMA protected container page configuration instruction 619. In some embodiments, the DMA protected container page configuration instruction may specify or otherwise indicate a protected container access to the associated protected container page to be configured for secure DMA, may specify or otherwise indicate an allowed physical access address 653 (e.g., a guest physical address) for the associated protected container page to be configured for secure DMA, and may specify or otherwise indicate one or more allowed access types or permissions for the associated protected container page to be configured for secure DMA. For example, the instruction may have fields to provide such information and/or specify or indicate registers storing such information. In some embodiments, the indicated protected container access may be a signal or indication that the access is being made from a protected container module to an allowed address (e.g., a linear or other logical address allowed for the protected container module and it may be used to help ensure that configuration is done only from within the protected container and that the protected container is only configuring a page allowed for that protected container. As one specific example, the indicated protected container access in an Intel® SGX implementation may be an enclave access (EA) indication, although the scope of the invention is not so limited. The DMA protected container page configuration instruction may represent a macroinstruction, machine code instruction, or assembly language instruction of an instruction set of the processor. The decode unit may output one or more relatively lower-level instructions or control signals (e.g., one or more microinstructions, micro-operations, micro-code entry points, decoded instructions or control signals, etc.), which reflect, represent, and/or are derived from the received relatively higher-level DMA protected container page configuration instruction. In some embodiments, the decode unit may include one or more input structures (e.g., port(s), interconnect(s), an interface) to receive an instruction, an instruction recognition and decode logic coupled therewith to recognize and decode the received instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

An execution unit 665 is coupled with the decode unit 664. Although a single execution unit is shown, it is to be appreciated that this single execution unit may represent one or more execution units and/or logic distributed throughout one or more units that collectively represent an execution unit to perform the instruction. The execution unit may receive the one or more decoded or otherwise converted instructions or control signals that represent and/or are derived from the DMA protected container page configuration instruction. The execution unit is operative in response to and/or as a result of the DMA protected container page configuration instruction being decoded (e.g., in response to one or more instructions or control signals decoded from the instruction) to perform one or more operations associated with the instruction.

As shown, in some embodiments, the execution unit may include optional security check logic 667. The security check logic and/or the execution unit may perform one or more security checks in order to determine whether or not to allow one or more other subsequent operations of the instruction to be performed to configure the associated protected container page for secure DMA. For example, in one embodiment, a check or determination may be made whether the specified or otherwise indicated protected container access resolves into a protected container page that is accessible to the DPCM that is performing the instruction. Alternatively, one or more additional and/or different security checks or determinations may optionally be performed before configuring the protected container page(s) for secure DMA. If any such checks or determinations fail, then the associated protected container page may not be configured for secure DMA. For example, the execution unit may optionally signal a fault 669 and may stop performing the instruction.

Conversely, if all such checks or determinations succeed, then execution unit 665 may proceed to configure the associated protected container page for secure DMA. As shown, the execution unit may include protected container page configuration logic 668. In some embodiments, the protected container page configuration logic and/or the execution unit may access one or more structures 631, such as, for example, a PCPMS, and configure one or more sets of information therein in order to configure the associated protected container page for secure DMA. For example, in some embodiments, a type of the page 652 may be configured to be a new dedicated type of page configured for secure DMA. As another example, in some embodiments, an allowed physical access address (e.g., a guest physical address previously determined by privileged system-level software) may be configured for the page. As yet another example, in some embodiments, one or more allowed access types 654 (e.g., read, write, read and write, etc.) for the associated protected container page may be configured. In other embodiments, additional configurations, different configurations, or a combination of both additional and different configurations may optionally be performed.

The execution unit and/or the processor may include specific or particular logic (e.g., transistors, integrated circuitry, or other hardware potentially combined with firmware (e.g., instructions stored in non-volatile memory) and/or software) that is operative to perform such operations in response to and/or as a result of the instructions (e.g., in response to one or more instructions or control signals decoded from the instructions). In some embodiments, the execution unit may include one or more input structures (e.g., port(s), interconnect(s), an interface) to receive source data, circuitry or logic coupled therewith to receive and process the source data, and one or more output structures (e.g., port(s), interconnect(s), an interface) coupled therewith to effect the operations.

Figure 7:
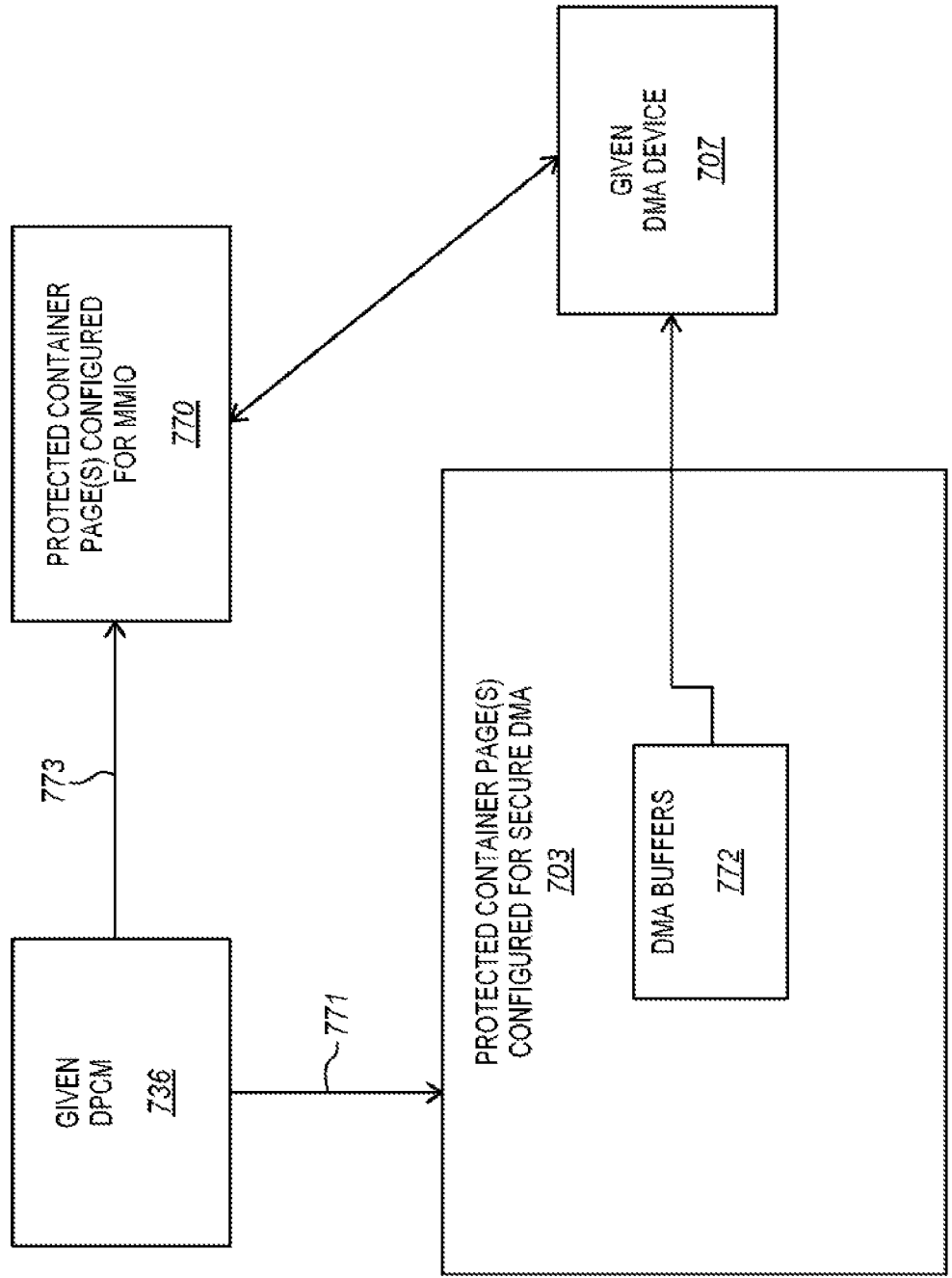
FIG. 7 is a block diagram of an example embodiment of a computer system showing a secure DMA specification phase.

FIG. 7 is a block diagram of a detailed example embodiment of a computer system 700 showing a secure DMA specification phase in which a given DPCM 736 specifies secure DMA operations to be performed by a given DMA device 707. As shown at 771, the DPCM 736 may access and configure DMA buffers 772 in one or more protected container pages 703 that are configured or otherwise operative for secure DMA. In some embodiments, physical addresses (e.g., guest physical addresses), for example based on those initially used to configure the one or more protected container pages 703, may be used as pointers.

As shown at 773, the DPCM 736 may access and configure one or more protected container pages 770 that are configured for or otherwise operative for secure MMIO to program device registers for the given DMA device 707 to specify and initiate the DMA operations. In some embodiments, secure MMIO as disclosed elsewhere herein may be used to program these device registers. In some embodiments, physical addresses (e.g., guest physical addresses), for example based on those initially used to configure the one or more protected container pages 703, may be used as pointers. Alternatively, an approach other than secure MMIO may optionally be used to specify and initiate the DMA operations.

Figure 8:
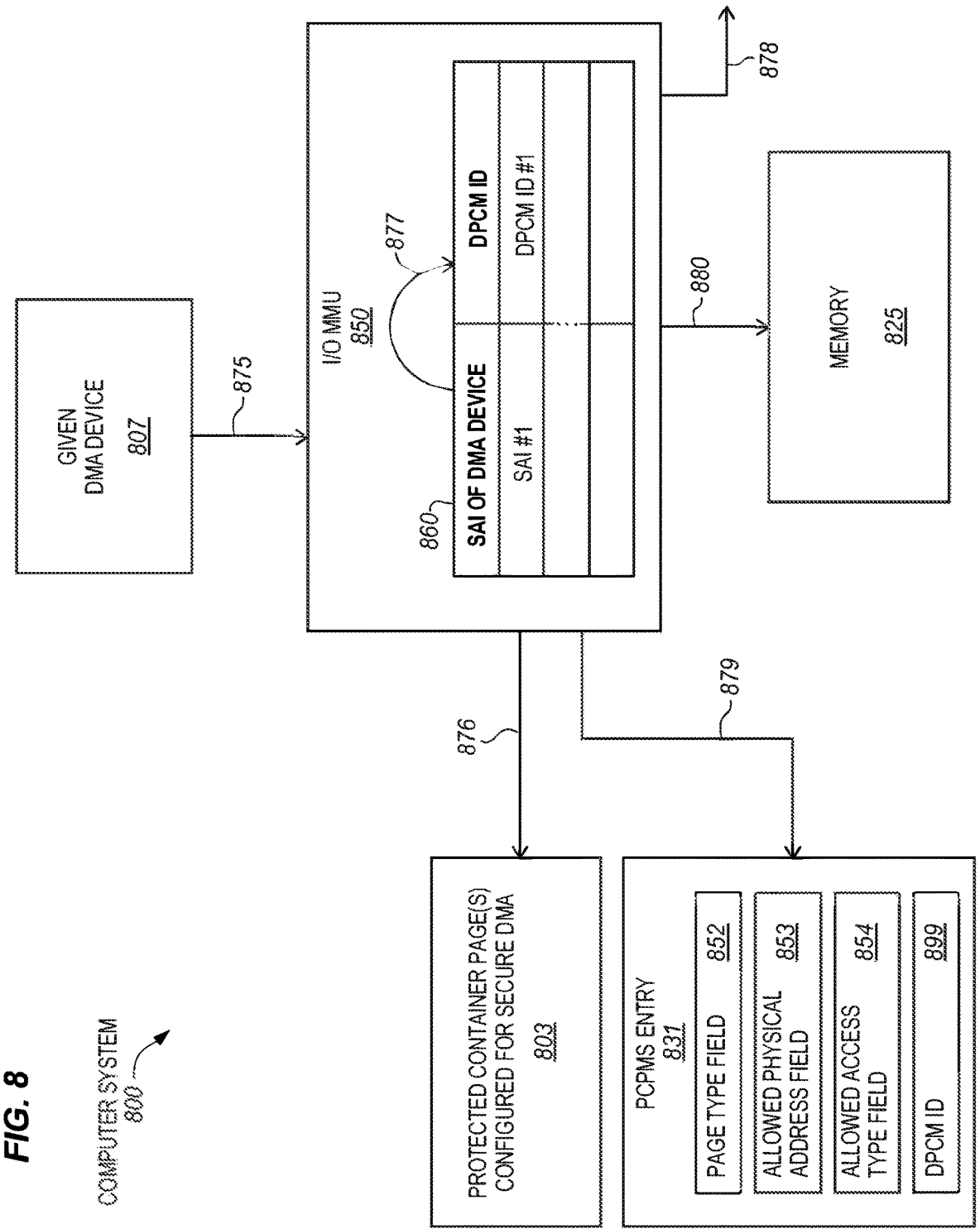
FIG. 8 is a block diagram of an example embodiment of a computer system showing an attempted DMA access and performing security checks to determine whether or not to allow the attempted DMA access.

FIG. 8 is a block diagram of a detailed example embodiment of a computer system 800 in which a given DMA device 807 attempts a DMA access 875 and an I/O MMU 850 is operative to perform security checks to determine whether or not to allow the attempted DMA access. As shown, the given DMA device attempts a DMA access 875. In some embodiments, the given DMA device may attempt the DMA access with a physical address and a device identifier. In some embodiments, the physical address may be a guest physical address that was previously programmed by a DPCM into one or more pages configured or operative for DMA (e.g., as described above in conjunction with FIG. 7). In some embodiments, the device identifier may be an SAI, although the scope of the invention is not so limited. In some embodiments, the DMA device may have both a secure SAI and an unsecure SAI and when performing secure DMA may perform the access using the secure SAI.

As further shown, the attempted DMA access may be made through an I/O MMU 850. The I/O MMU may be used for memory accesses by devices. The I/O MMU may be operative to perform one or more security checks to determine whether or not to allow the attempted DMA access. A few representative examples of types of security checks that may optionally be performed in some embodiments are described further below, although it is to be appreciated that subsets of these security checks, supersets of these security checks, and other security checks entirely, may instead optionally be performed.

As shown at 876, the I/O MMU 850 may determine whether or not the physical address of the attempted DMA access resolves into a protected container memory and/or into one or more protected container pages 803 that are configured for or otherwise operative for secure DMA. By way of example, this may include translating the physical address (e.g., the guest physical address) of the attempted access to a host physical address, if needed, and checking to see if the host physical address resolves into the protected container memory and/or into the protected container page(s) 803. The I/O MMU may signal or otherwise cause a DMA termination event 878, such as a fault, if the physical address does not resolve into the protected container memory and/or into one or more protected container pages 803. This may represent an inconsistency in that secure DMA is being attempted (e.g., as indicated by the secure SAI) but the attempted access is not being made to protected container memory.

As shown at 877, the I/O MMU may attempt to lookup a DPCM identifier in an I/O MMU mapping table 860 with the device identifier associated with the attempted DMA access. For example, if the device identifier is an SAI, the I/O MMU may attempt to find an entry in the table that maps the SAI to a corresponding assigned or mapped DPCM identifier. For example, as shown, an entry in the table may include an SAI #1 that corresponds to the given DMA device as well as a DPCMID #1 that corresponds to the given DPCM module, which is configured to perform secure DMA with the given DMA device. In such a case, the I/O MMU may retrieve the corresponding mapped or assigned DPCM identifier (e.g., DPCMID #1) from the table. This may be used in part to establish that the given DMA device is mapped to the given DPCM. Alternatively, if the SAI or other device identifier is not validly mapped to a DPCM identifier in the table, then the I/O MMU may be operative to signal or otherwise cause the fault or other DMA termination event 878.

As shown at 879, the I/O MMU may access metadata associated with the attempted access. For example, in some embodiments, the I/O MMU may access a PCPMS entry 831 corresponding to a page that the DMA access attempts to access. By way of example, the page may represent an entry for the host physical address. In some embodiments, the I/O MMU may be operative to access a page type field 852 to determine whether or not the indicated type of page is configured for secure DMA. If not, the I/O MMU may be operative to cause the DMA termination event 878. In some embodiments, the I/O MMU may be operative to access an allowed physical address field 853 to determine whether or not the indicated allowed physical address matches and/or is compatible with a physical address of the attempted DMA access. This may be used in part to determine if the DMA device is attempting to access the memory that was set up or allowed for secure DMA. If not, the I/O MMU may be operative to cause the DMA termination event 878. In some embodiments, the I/O MMU may be operative to access an allowed access type field 854 to determine whether or not the indicated allowed access type or types match or are compatible with the access type of the attempted DMA access. If not, the I/O MMU may be operative to cause the DMA termination event 878. In some embodiments, the I/O MMU may be operative to access a DPCMID field 899 to determine whether or not a DPCMID matches the DPCMID obtained from the I/O MMU mapping table. For example, in an Intel® SGX implementation, an enclave ID (EID) may be obtained from SGX Enclave Control Structure (SECS) by using EPCM.SID and a check may be performed whether an EID obtained from the I/O MMU mapping table matches the EID from a SECS.EID field. If the match is not detected, the I/O MMU may be operative to cause the DMA termination event 878.

These are just a few illustrative examples. In other embodiments, the I/O MMU may perform fewer, more, or different security checks. If all the implemented security checks desired for the particular implementation succeed, then as shown at 880, the I/O MMU may be operative to allow the attempted DMA access to be performed. Otherwise, if any of the implemented security checks fail, the I/O MMU may be operative to cause the DMA termination event 878.

Figure 9:
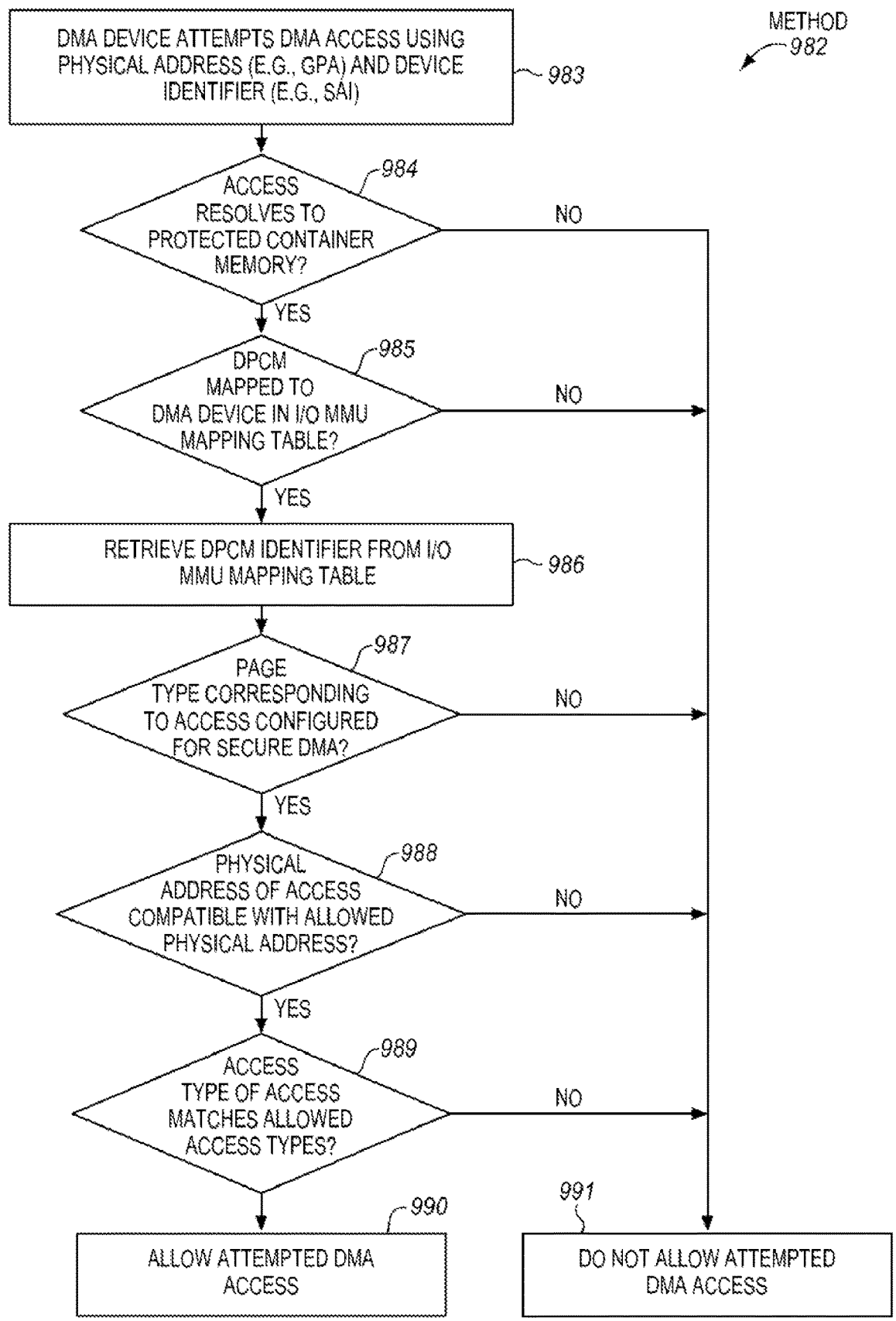
FIG. 9 is a block flow diagram of an example embodiment of a method of performing security checks to determine whether or not to allow secure DMA.

FIG. 9 is a block flow diagram of a detailed example embodiment of a method 982 of secure DMA in which a DMA device attempts a DMA access and a number of security checks are used to determine whether or not the attempted DMA access is allowed to be performed. At block 983, the DMA device attempts the DMA access using a physical address and a device identifier. In some embodiments, the physical address may be a guest physical address, although the scope of the invention is not so limited. In some embodiments, the device identifier may be a SAI, although the scope of the invention is not so limited.

At block 984, a determination is made whether or not the access resolves to a protected container memory and/or one or more pages thereof that are configured for secure DMA. If so, the method continues to block 985. If not the method advances to block 991.

At block 985, a determination is made whether or not a DPCM is mapped to the DMA device attempting the access in an I/O MMU mapping table. If so, the method continues to block 986. If not the method advances to block 991. At block 986, a DPCM identifier corresponding to the device identifier may be retrieved from the I/O MMU mapping table. As one example, in an Intel® SGX implementation, the DPCM identifier may be a secure enclave ID, although the scope of the invention is not so limited.

At block 987, a determination is made whether or not a page type corresponding to the access is configured for secure DMA. For example, this may include determining if the page type is a particular new dedicated type of page configured for secure DMA. Representatively, this may include looking up a type of the page the attempt is trying to access in an EPCM, other PCPMS, or other metadata structure. If so, the method continues to block 988. If not the method advances to block 991.

At block 988, a determination is made whether or not the physical address associated with the attempted access (e.g., the guest physical address associated with a read or write operation) matches or is at least compatible with an allowed physical access address for the page that the attempt is trying to access. Representatively, this allowed physical access address may be stored in an EPCM, other PCPMS, or other metadata structure. If so, the method continues to block 989. If not the method advances to block 991.

At block 989, a determination is made whether or not an access type of the attempted access, such as a read or write, matches or is at least compatible with an allowed access type(s) for the page that the attempt is trying to access. Representatively, the allowed access type(s) may be stored in an EPCM, other PCPMS, or other metadata structure. If so, the method continues to block 990. If not the method advances to block 991.

At block 990, the attempted DMA access may be allowed. By way of example, in the secure DMA access data within a portion of a protected container memory (e.g., a new page which allows secure DMA) may be accessed by the DMA device. Advantageously, this may be used to provide a secure, low-latency, generally high-bandwidth bi-directional communication data channel between the DPCM and various different types of DMA devices. As one specific illustrative example, the DMA device may be a USB connected device, and the secure DMA may be used to store data directly from the USB connected device to a new type of secure DMA permitting page in the protected container memory. In this way, the data may be stored protected from the USB connected device into the page in the protected container memory that is accessible to the DPCM which may protect it from being accessed by other entities in the system including even the most highly privileged system software and different protected container modules. Conversely, at block 991, if any of the access checks fail, the attempted DMA access may not be allowed and/or may be prevented.

In some embodiments, a protected container architecture of a processor and/or protected container access control logic of the processor may allow secure MMIO in which a processor may use secure MMIO to communicate information (e.g., control information, configuration information, etc.) to an MMIO device. For example, the secure MMIO may be used to write to control registers of the MMIO device mapped to an MMIO space in a way that other software (e.g., other protected containers, privileged software, etc.) cannot access the same MMIO space. Initially, a secure MMIO configuration phase may be performed in which a given DPCM and a given MMIO device may be mapped to one another and secure MMIO is configured. Then, an MMIO implementation phase may be performed in which the given DPCM may perform secure MMIO to communicate information (e.g., control information, configuration information, etc.) to the given MMIO device.

Figure 10:
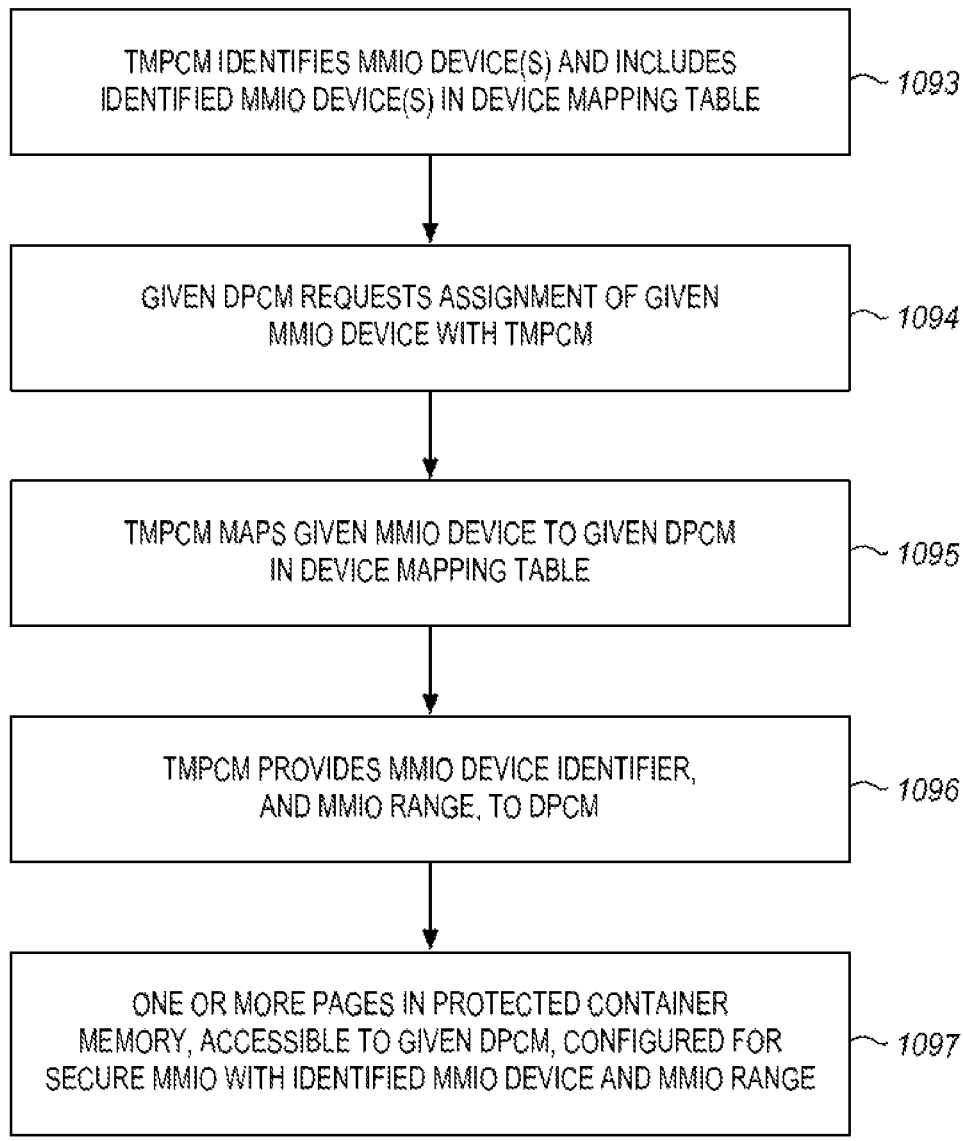
FIG. 10 is a block flow diagram of an example embodiment of a method of configuring secure memory-mapped input-output (MMIO).
Figure 11:
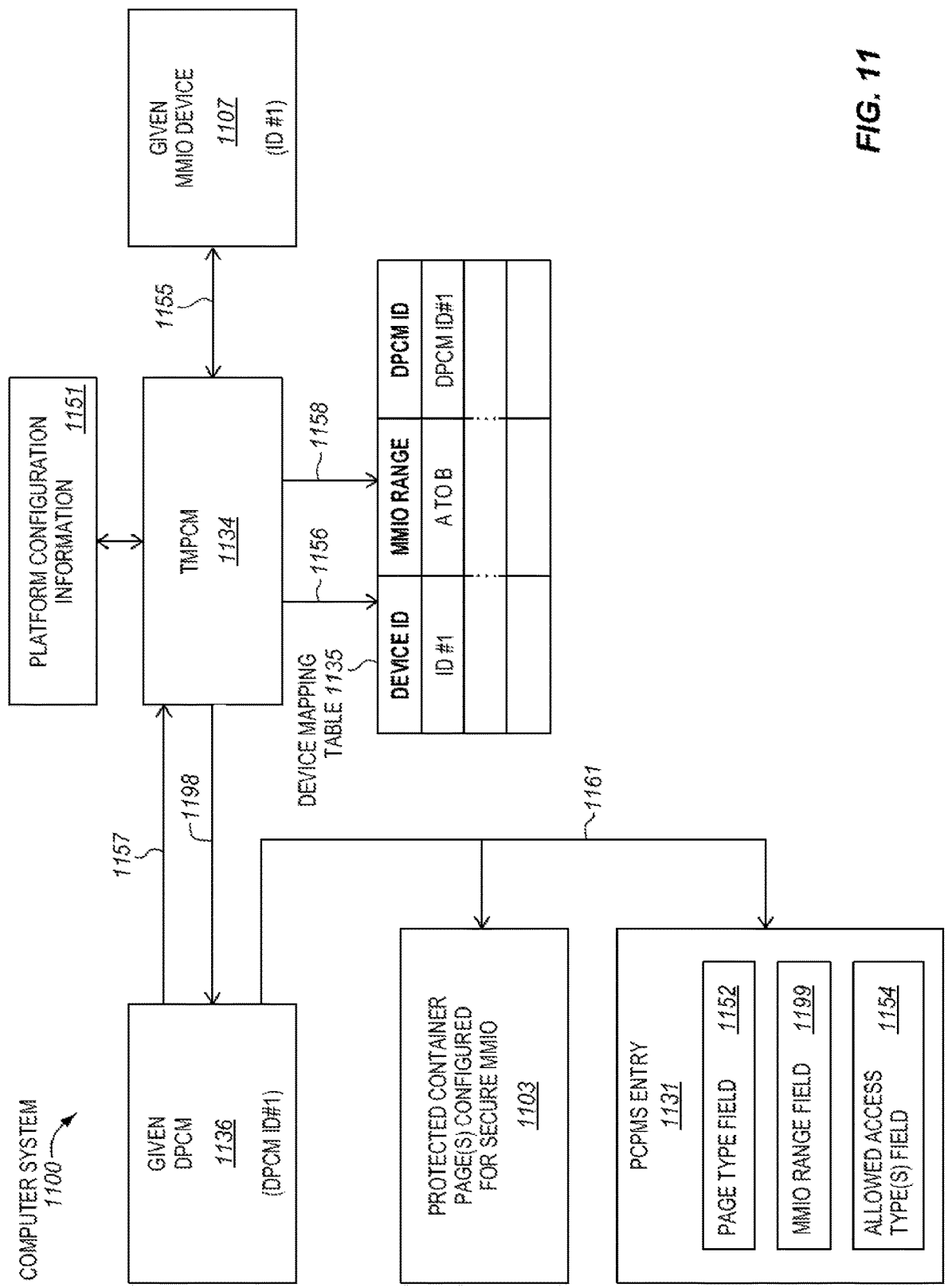
FIG. 11 is a block diagram of an example embodiment of a computer system showing a secure MMIO configuration phase.

FIG. 10 is a block flow diagram of a detailed example embodiment of a method 1092 of mapping a given DPCM and a given MMIO device to one another and secure MMIO is configured. FIG. 11 is a block diagram of a detailed example embodiment of a computer system 1100 showing a secure MMIO configuration phase in which a given DPCM 1136 and a given MMIO device 1107 are mapped to one another and secure MMIO is configured. To streamline the description, the method 1092 will be described in conjunction with the computer system 1100. However, it is to be appreciated that the method 1092 may optionally instead be performed by different computer systems and/or that the computer system 1100 may optionally instead perform different methods.

Referring to FIG. 10, at block 1093, a TMPCM may enumerate or otherwise identify one or more MMIO devices including a given MMIO device in a computer system, and may include the identified MMIO devices in a device mapping table. In some embodiments, the TMPCM may also identify resources of the MMIO devices, such as, for example, their respective MMIO ranges. As shown in FIG. 11, a TMPCM 1134 may identify 1155 a given MMIO device 1107, and access 1156 a device mapping table 1135 to have it include the given MMIO device. In some embodiments, the TMPCM may use platform configuration information 1151 to identify the MMIO devices, for example, in an analogous way to that described above for the DMA devices (e.g., in conjunction with block 445 of FIG. 4).

Referring again to FIG. 10, at block 1094, a given DPCM may request ownership or other assignment of a given one of the identified MMIO devices with the TMPCM. For example, the DPCM may transmit a message to the TMPCM or otherwise signal the TMPCM about this request. Referring now to FIG. 11, the given DPCM may send a message, signal, or other request 1157 to the TMPCM 1134 to request that the given MMIO device 1107 be mapped to the given DPCM 1136.

Referring again to FIG. 10, at block 1095, the TMPCM may assign or otherwise map the given MMIO device to the given DPCM in the device mapping table. This mapping may be, but is not required to be, an exclusive mapping, as discussed elsewhere herein. For example, some I/O devices may be mapped to different device protected container modules. As an example, a Universal Serial Bus (USB) controller may have different functions that may be mapped, for either MMIO or DMA, to different DPCMs. An another example, under certain conditions, a given function of an I/O device may be mapped to different DPCMs based on an additional identifier, such as, for example, a VLAN for a network controller. As shown in FIG. 11, the TMPCM 1134 may map 1158 the given MMIO device 1107 to the given DPCM 1136 in the device mapping table 1135. For example, the TMPCM may store a device protected container module identifier (DPCMID #1) corresponding to the given DPCM in an entry of the device mapping table 1135 corresponding to the given MMIO device. One example of a suitable DPCMID, in an Intel® SGX implementation, is an enclave identifier (EID), although the scope of the invention is not so limited. In this example, the given MMIO device has a device identifier (ID) of ID #1 and an MMIO range from "A to B". This creates an association or mapping between the given MMIO device and the given DPCM.

Referring again to FIG. 10, at block 1096, the TMPCM may provide a device identifier (ID) of the given mapped MMIO device and an MMIO range of the given mapped MMIO device to the DPCM. By way of example, this information may be provided in a message from the TMPCM to the DPCM or may be available in platform configuration information for the computer system. As shown in FIG. 11, the TMPCM 1134 may send a message 1198 to provide a device identifier of the given mapped MMIO device 1107 (e.g., ID #1) and an MMIO range of the given mapped MMIO device (e.g., from A to B) to the given DPCM 1136.

Different types of device identifiers of the mapped MMIO devices are possible in different embodiments. In some embodiments, each MMIO device may have a unique row number, entry, or other index in the device mapping table. In some embodiments, such an index may serve as a device identifier for the MMIO device. For example, the ID #1 of the given MMIO device may be the row number that stores the MMIO range of from "A to B" for the given MMIO device. In other embodiments, each MMIO device may have a Security Attributes of Initiator (SAI) as its device ID. Alternatively, other large and/or unique numbers may optionally be used as the device identifiers.

Referring again to FIG. 10, at block 1097, one or more pages in a protected container memory, which are optionally within the logical address space (e.g., a linear, virtual, or other logical address space) of the given DPCM, or at least are accessible to the given DPCM, are configured to allow for secure MMIO with the identified given MMIO device and its MMIO range. As shown in FIG. 11, the given DPCM 1136 may at least partially configure one or more protected container memory pages 1103, which are accessible to the given DPCM, to allow for secure MMIO with the identified given MMIO device (e.g., ID #1) and its MMIO range (e.g., from A to B).

The protected container page(s) may be configured for secure MMIO in different ways in different embodiments. In some embodiments, if a protected container page isn't already available to be configured for secure MMIO, the DPCM may allocate a new protected container page. In some embodiments, before configuring the protected container page(s) for secure MMIO, one or more security checks or determinations may optionally be performed. For example, in some embodiments, a check or determination may optionally be made whether or not the device identifier of the given MMIO device is properly mapped to the given DPCM. For example, this may include communicating with the TMPCM to verify the mapping of the given DPCM and the given MMIO device. By way of example, the given DPCM may provide the MMIO device identifier previously obtained from the TMPCM (e.g., as discussed for block 1096) to the TMPCM as a query, and in order to configure the one or more pages for secure MMIO, it may be checked that the TMPCM returns a DPCMID that matches the DPCMID that is attempting to configure the one or more pages for secure MMIO.

As another example, in some embodiments, a check or determination may optionally be made whether or not the MMIO offset is page aligned (e.g., 4 kilobyte page aligned, or aligned with other implemented page sized boundaries) since generally the memory may be managed in page sized portions. As a further example, in some embodiments, a check or determination may optionally be made whether or not the requested offset and the offset plus a page size (e.g., a 4 kilobyte or other implemented page size) is within the MMIO range. Such checks or determinations may optionally be used to help ensure that an access isn't able to access to a different MMIO range that may potentially be mapped to a different DPCM. Alternatively, one or more additional and/or different security checks or determinations may optionally be performed before configuring the protected container page(s) for secure MMIO. If any such implemented checks or determinations fail, then the protected container page(s) may not be configured for secure MMIO. Conversely, if such checks or determinations succeed, then the protected container page(s) may be configured for secure MMIO.

Referring to FIG. 11, assuming that any such optional checks or determinations succeed, as shown at 1161 the given DPCM 1136 may configure the protected container memory page(s) 1103 for secure MMIO. The protected container page(s) may be configured for secure MMIO in different ways in different embodiments. In some embodiments, this may include changing metadata in a PCPMS. For example, for each page configured for secure MMIO, metadata 1152, 1154, 1199 may be changed in a corresponding PCPMS entry 1131. Alternatively, instead of the metadata being in the PCPMS or another single structure, two or more structures may be used to store this and/or additional and/or different metadata for the protected container page(s) 1103.

As shown, in some embodiments, the given DPCM 1136 may configure a page type field 1152 to have a page type that allows for secure MMIO. In some embodiments, there may be a new dedicated type of page for which secure MMIO is allowed. For example, in an Intel® SGX implementation, this may include changing an EPCM.PT field of an EPCM to have a new value assigned to a type of page that allows for secure MMIO. In contrast, other types of protected container memory pages may not allow for secure MMIO.

As shown, in some embodiments, the given DPCM 1136 may configure an MMIO range field 1199 in order to configure an allowed MMIO range to be used for secure MMIO. For example, in an Intel® SGX implementation, this may include changing a new EPCM.IOADDR field of an EPCM to specify an allowed MMIO range, for example, a base plus offset, to be used for secure MMIO.

As shown, in some embodiments, the given DPCM 1136 may optionally configure an allowed access type(s) field 1154 in order to configure the access type or types that are allowed for the protected container page(s) to be used for secure MMIO. For example, in an Intel® SGX implementation, this may include changing an EPCM.RW field of an EPCM to specify the allowed access type permissions. Examples of different access types that may or may not be configured for the at least one protected container memory page include, but are not limited to, a write (W) allowed access type and a read and write (RW) allowed access type. Configuring such access types is optional, not required. In other embodiments, only certain types of access types may optionally be allowed by default, or all access types may optionally be allowed by default.

In some embodiments, a new MMIO protected container page configuration instruction may optionally be included in an instruction set of a processor to allow a protected container page to be configured for secure MMIO. In some embodiments, the instruction may be a user-level instruction, and a DPCM may use the instruction to configure a page in its linear or other logical address space, or which is at least accessible to the DPCM, for secure MMIO. In some embodiments, the MMIO protected container page configuration instruction may specify or otherwise indicate a linear or other logical address of the protected container memory page, may specify or otherwise indicate an MMIO device identifier, and may specify or otherwise MMIO address information (e.g., an MMIO space offset). In some embodiments, the instruction may optionally specify or otherwise indicate one or more allowed access types, such as, for example, read, write, or read and write. For example, the instruction may have fields to provide such information and/or specify or indicate registers storing such information. The MMIO protected container page configuration instruction may be decoded by a decode unit and the decoded instructions or control signals may be executed by an execution unit. The decode unit may be the same as or similar to the decode unit 664 of FIG. 6.

The execution unit responsive to the instruction may be operative to perform any of the optional security checks or determinations mentioned above and/or others desired for the particular implementation. For example, the execution unit may perform a check to ensure that the MMIO device is mapped to the DPCM performing the instruction, may perform a check to ensure that the offset is page aligned and that the requested offset and the offset plus the page size is within the MMIO range. If such security checks or determinations succeed, the execution unit responsive to the instruction may configure the page for secure MMIO. This may be done by performing any of the configuration operations mentioned above and/or others desired for the particular implementation. For example, in some embodiments the execution responsive to the instruction may configure a page type to be one that allows secure MMIO (e.g., configure the page type field 1152), configure an MMIO range (e.g., configure the MMIO range field 1199), and optionally configure one or more allowed access types (e.g., configure the allowed access type(s) field 1154). Alternatively, such operations may optionally be apportioned into two or more separate instructions if desired.

Figure 12:
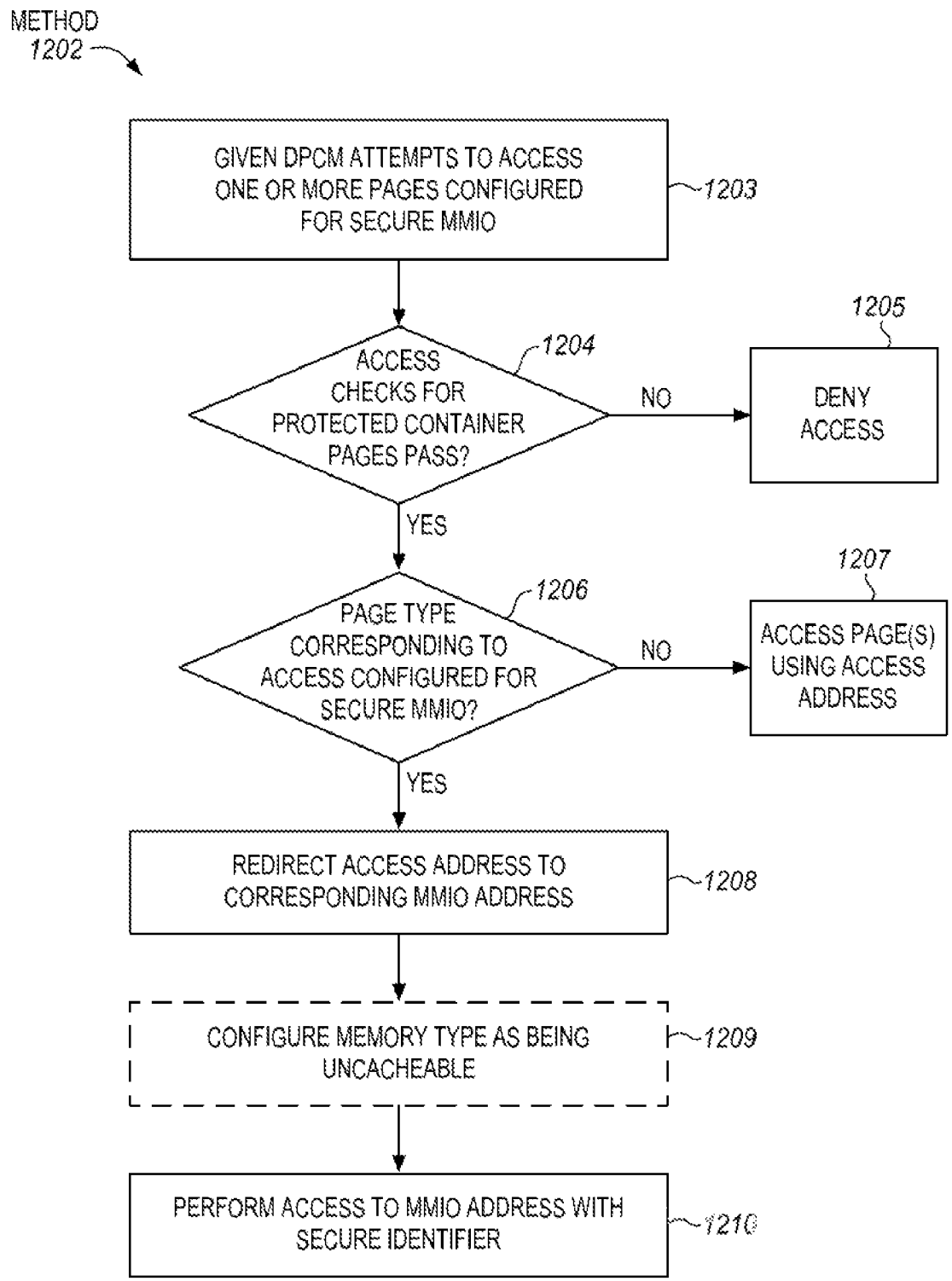
FIG. 12 is a block flow diagram of a detailed example embodiment of a method of a given device protected container module (DPCM) performing secure MMIO.
Figure 13:
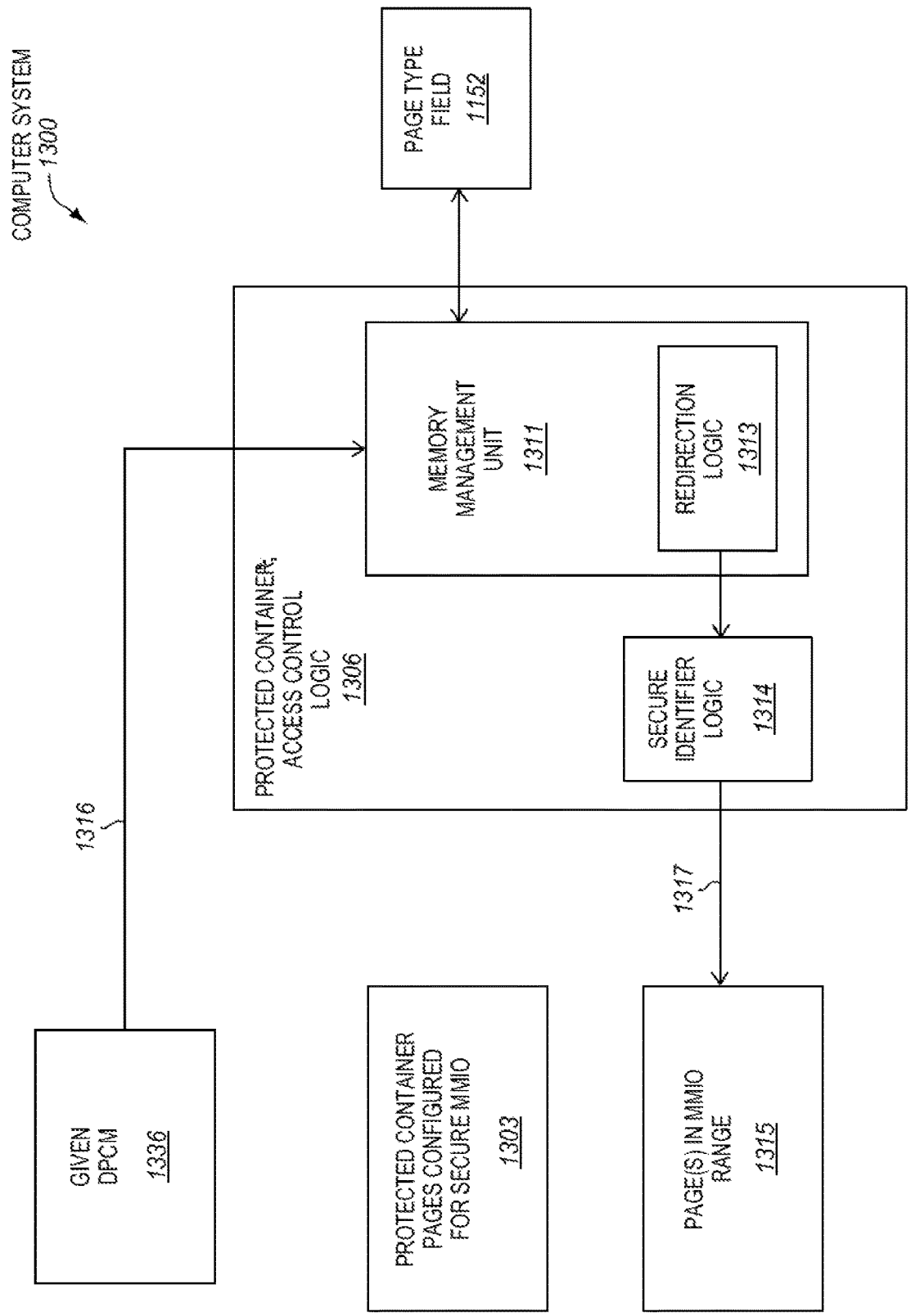
FIG. 13 is a block diagram of an example embodiment of a computer system showing a given DPCM performing secure MMIO.

FIG. 12 is a block flow diagram of a detailed example embodiment of a method 1202 of a given DPCM performing secure MMIO. FIG. 13 is a block diagram of a detailed example embodiment of a computer system 1300 showing a given DPCM performing secure MMIO. To streamline the description, the method 1202 will be described in conjunction with the computer system 1300. However, it is to be appreciated that the method 1202 may optionally instead be performed by different computer systems and/or that the computer system 1300 may optionally instead perform different methods.

Referring to FIG. 12, at block 1203, a given DPCM may attempt to access (e.g., with a read or a write operation) one or more pages configured for secure MMIO. As shown in FIG. 13, a given DPCM 1336 may attempt to access 1316 one or more protected container pages 1302 configured for secure MMIO. In some embodiments, the access attempt may be made with a linear or other logical access address that is within the logical address space of the given DPCM or is at least accessible to the DPCM within a protected container memory.

Referring to FIG. 12, at block 1204, a determination may be made whether or not one or more access control checks for the one or more pages configured for secure MMIO pass. If the check(s) do not pass, the method may advance to block 1205 where the attempted access may be denied. For example, a fault may be signaled. Otherwise, if the check(s) pass, then the method may advance to block 1206. As shown in FIG. 13, the attempted access 1316 may be made through protected container access control logic 1306 including a memory management unit (MMU) 1311. The protected container access control logic and/or the MMU may perform one or more access control checks to determine whether or not to allow the attempted access and/or secure MMIO.

Different types of access checks are suitable for different embodiments. In some embodiments, any one or more of conventional protected container memory access checks may optionally be performed. By way of example, in some embodiments, the access checks may condition allowing the attempted access based on it being made in a protected container mode, being made to the protected container memory, being made from only the protected container module to which the pages of the protected container memory are assigned, and being made with an allowed access type. In other embodiments, fewer or more or different access controls checks may optionally be used. In some embodiments, the protected container memory page(s) to be used for the secure MMIO may be allocated either exclusively or non-exclusively for use by the single given DPCM. In the case of an exclusive mapping, which may help to provide even more protection but is not required, no other protected container modules, no other DPCMs, and no highly privileged system level software modules may be able to access these one or more protected container memory page(s) which are to be used for the secure MMIO exclusively by the given mapped DPCM.

Referring to FIG. 12, at block 1206, a determination may be made whether or not a page type corresponding to the attempted access is configured for secure MMIO. If the page is not configured for secure MMIO, the method may advance to block 1207 where the attempted access may be performed based on the original access address to a page in the protected container memory. Alternatively, if the page is configured for secure MMIO, the method may advance to block 1208. As shown in FIG. 13, the MMU 1311 and/or the protected container access control logic 1306 may check a page type field 1152 to determine whether or not a page type of the page the access attempt is directed at is configured for secure MMIO. If not, the MMU may allow the attempted access to the page using the original access address. If so, in some embodiments, the MMU may be operative to redirect the attempted access to a different physical address.

Referring to FIG. 12, at block 1208, in some embodiments, the access address of the original attempted access (e.g., for block 1203) may be redirected to a corresponding MMIO address. As shown in FIG. 13, the MMU 1311 may include redirection logic 1313 to redirect an attempted access address associated with the attempted access 1316 from the protected container page(s) 1303 configured for secure MMIO to one or more pages 1315 in an MMIO range for the mapped MMIO device. For example, in some embodiments, the MMU may be operative to convert the original attempted access address to a corresponding MMIO address by replacing a page frame (e.g., the upper portion of the physical address) of the original attempted access address with a page frame for the MMIO address. By way of example, the page frame for the MMIO address may optionally be stored in the PCPMS or another metadata structure. For example, this may be performed using information from the MMIO range field 1199 of FIG. 11. Initially the access is into the protected container memory page which may allow leveraging existing or otherwise using protected container page access control checks, and then the access may be redirected outside of the protected container memory.

Referring to FIG. 12, at block 1209, in some embodiments, the memory type of the redirected MMIO page(s) may optionally be configured as being un-cacheable. In other embodiments, this may optionally be omitted.

Referring to FIG. 12, at block 1210, a redirected access may optionally be performed to the corresponding MMIO address with an accompanying secure identifier. As shown in FIG. 13, the redirected access to the page(s) 1315 in the MMIO range may be made through secure identifier logic 1314. The secure identifier logic may be operative to add a secure identifier to the redirected access to the MMIO range. As one example, in some embodiments, the secure identifier logic may be operative to apply a protected container SAI to the access to indicate that the access is a secure access being made by a protected container, but may not apply such a protected container SAI if the access is not being made by a properly mapped DPCM. In some embodiments, the protected container SAI or other secure identifier may attest to the MMIO device that the attempted access has been verified by the processor as being made not only from the processor but also from a verified DPCM mapped to the MMIO device. Alternatively, other secure identifiers may optionally be used. In some embodiments, the MMIO device may support a secure mode as well as generally but optionally an unsecure mode. When in secure mode, the MMIO device may be operative to distinguish between a protected container SAI or other secure identifier and something that is not a secure identifier, and may be operative to only accept or recognize MMIO accesses that have such a secure identifier (e.g., the protected container SAI). In some embodiments, the MMIO device may only be operative to be switched from the secure mode to the unsecure mode from control made while in a secure mode (e.g., with a protected container SAI indication). In some embodiments, the access may be prevented from being compromised by a basic input-output system (BIOS) misconfiguration of the MMIO address space.

Advantageously, the DPCM properly mapped to the corresponding MMIO device may be able to access the MMIO space of the MMIO device without other non-mapped protected container modules or software (e.g., even privileged system software) being able to access this MMIO space. This may allow one or more properly mapped DPCMs to exclusively and securely control or configure the MMIO device from the processor side. This may be used to provide a control or configuration path for the MMIO device or may potentially be used to provide a low bandwidth data path for the MMIO device. Various operations and methods have been described. Some of the methods have been described in a relatively basic form in the flow diagrams, but operations may optionally be added to and/or removed from the methods. In addition, while the flow diagrams show a particular order of operations according to embodiments, that order is exemplary. Alternate embodiments may perform the operations in different order, combine certain operations, overlap certain operations, etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies® of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
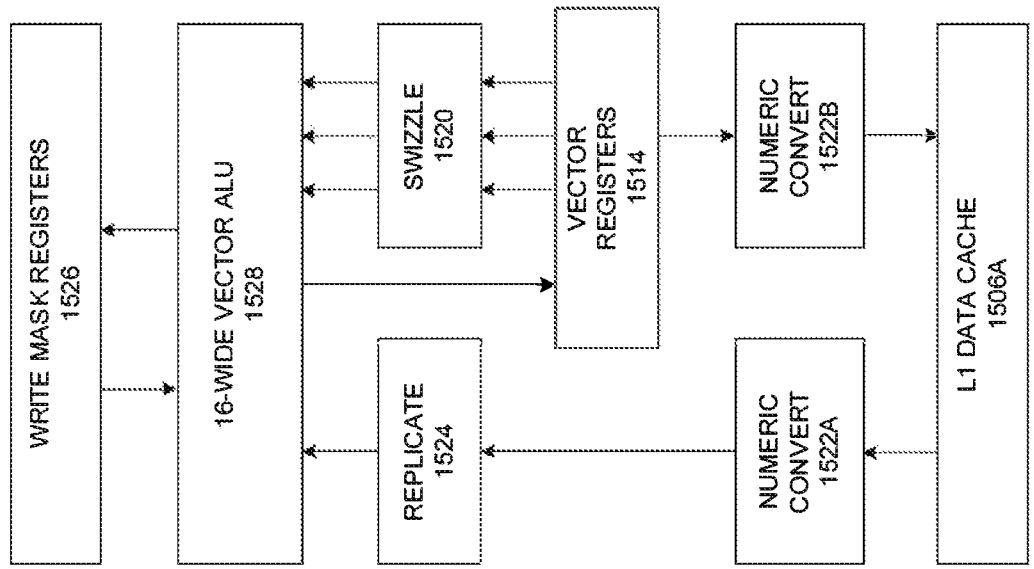
FIG. 15B is a block diagram of an embodiment of an expanded view of part of the processor core of FIG. 15A.
Figure 15A:
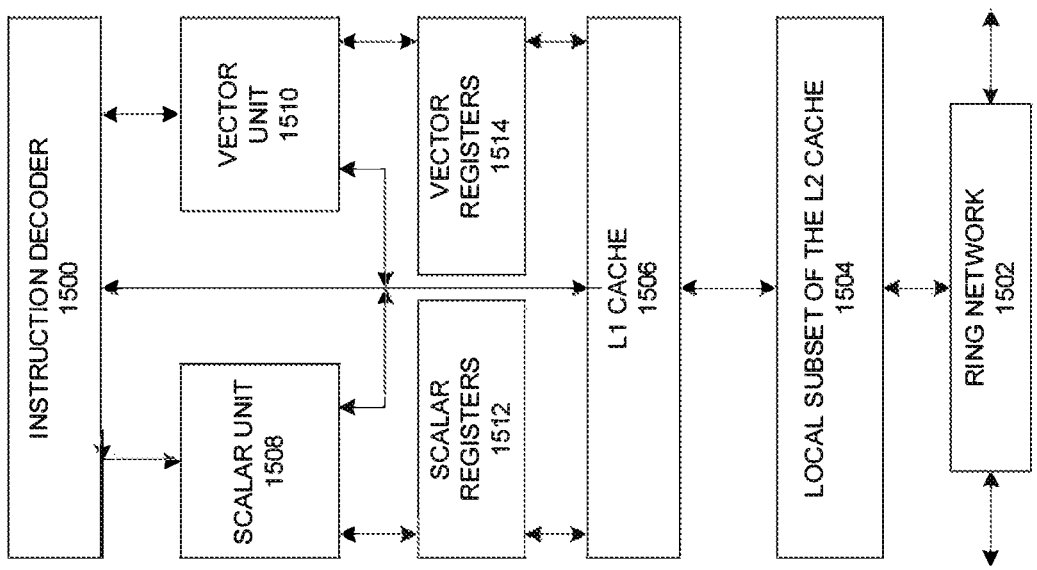
FIG. 15A is a block diagram of an embodiment of a single processor core, along with its connection to the on-die interconnect network, and with its local subset of the Level 2 (L2) cache.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A, part of the L1 cache 1504, as well as more detail regarding the vector unit 1510 and the vector registers 1514. Specifically, the vector unit 1510 is a 16-wide vector processing unit (VPU) (see the 16-wide arithmetic logic unit (ALU) 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Processor with Integrated Memory Controller and Graphics

Figure 16:
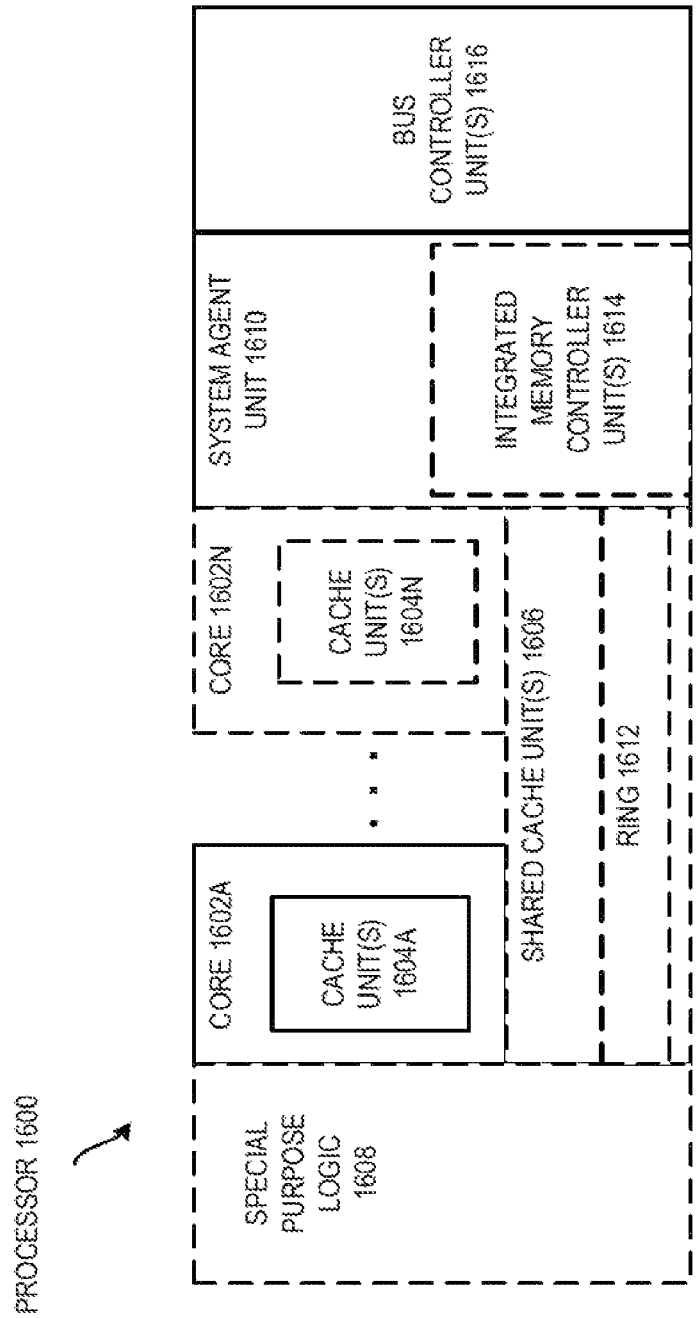
FIG. 16 is a block diagram of an embodiment of a processor that may have more than one core, may have an integrated memory controller, and may have integrated graphics.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated special purpose (e.g., graphics) logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated special purpose (e.g., graphics) logic 1608. The display unit is for driving one or more externally connected displays.

The cores 1602A-N may be homogenous or heterogeneous in terms of architecture instruction set; that is, two or more of the cores 1602A-N may be capable of executing the same instruction set, while others may be capable of executing only a subset of that instruction set or a different instruction set.

Exemplary Computer Architectures

FIGS. 17-21 are block diagrams of exemplary computer architectures. Other system designs and configurations known in the art for laptops, desktops, handheld personal computers (PCs), personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
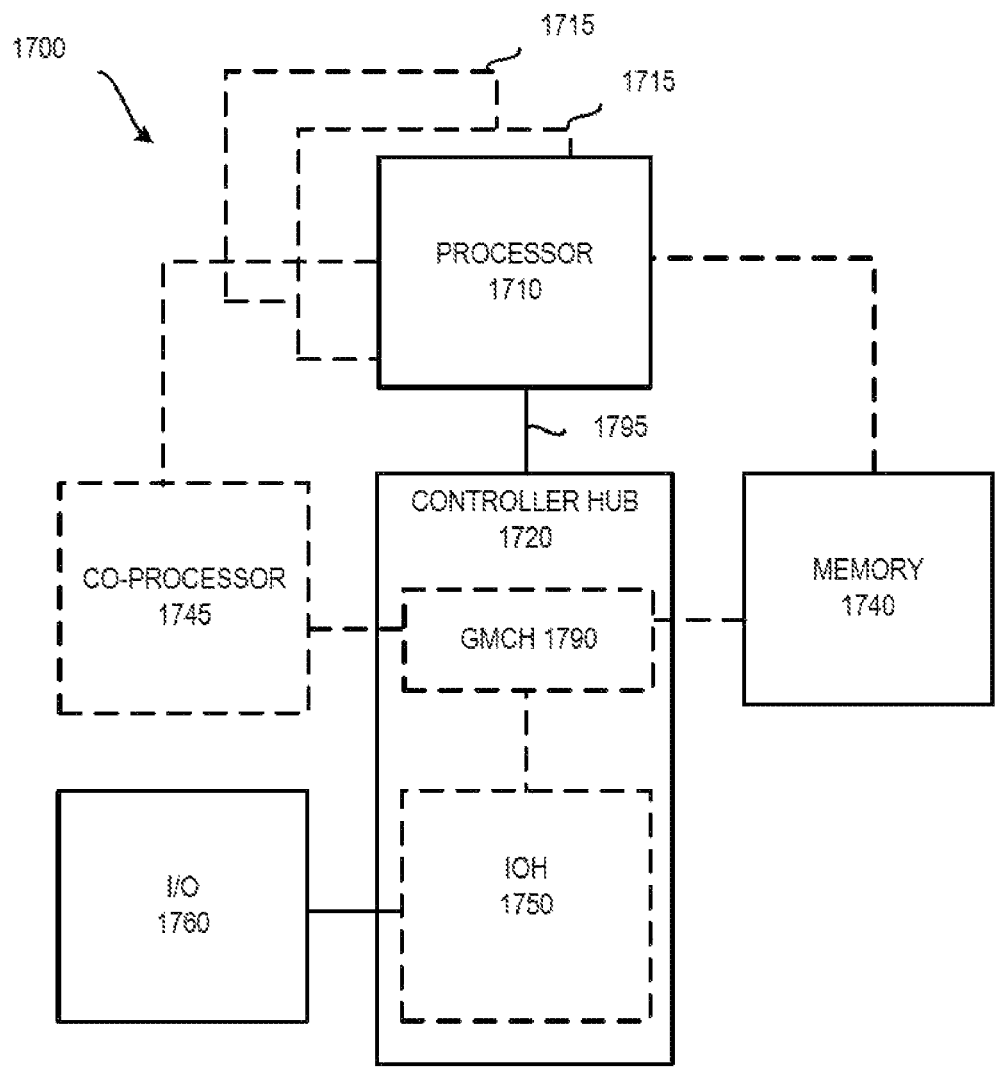
FIG. 17 is a block diagram of a first embodiment of a computer architecture.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput many integrated core (MIC) processor, a network or communication processor, compression engine, graphics processor, GPGPU, embedded processor, or the like. In one embodiment, controller hub 1720 may include an integrated graphics accelerator.

There can be a variety of differences between the processors 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
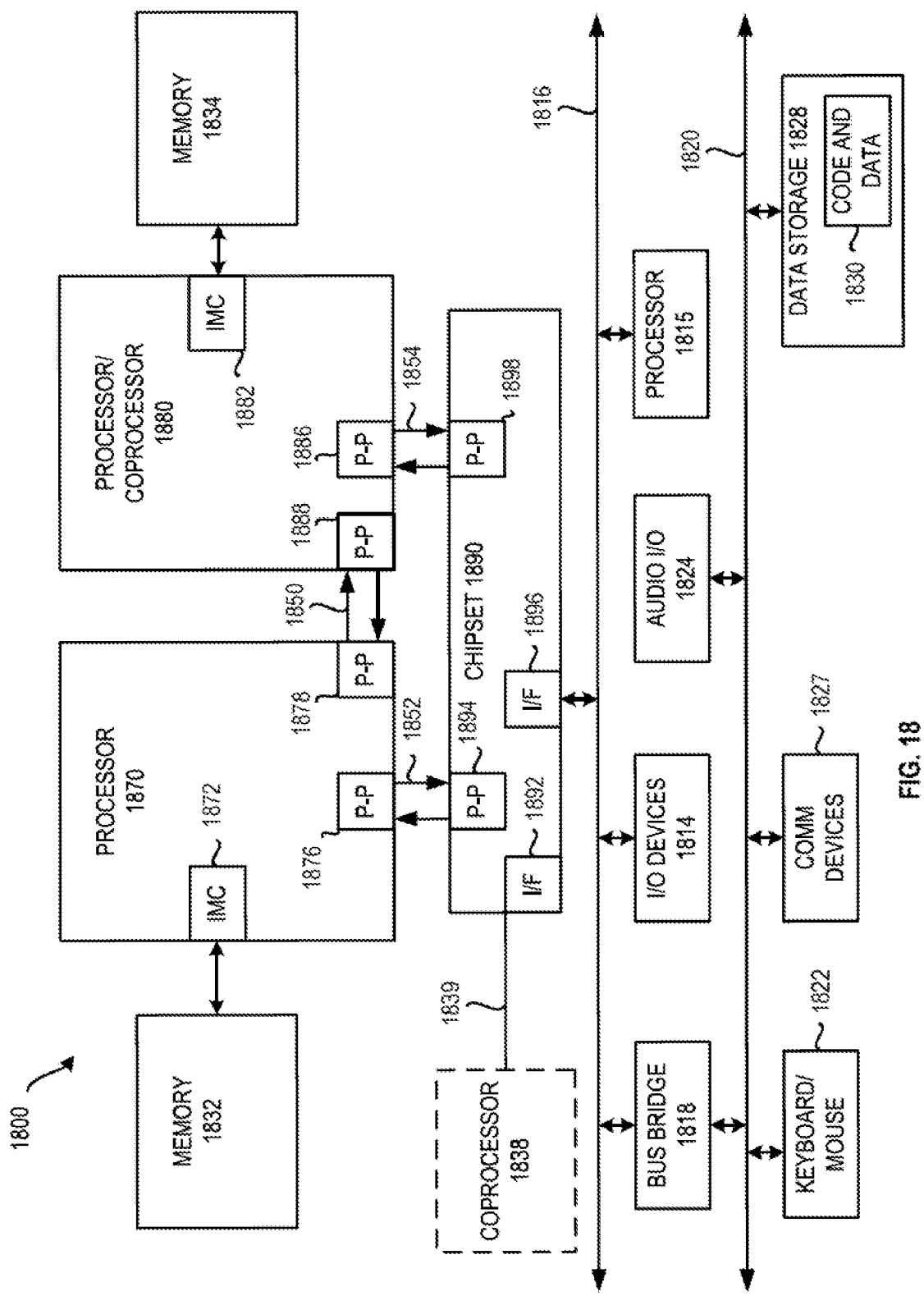
FIG. 18 is a block diagram of a second embodiment of a computer architecture.

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 and coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
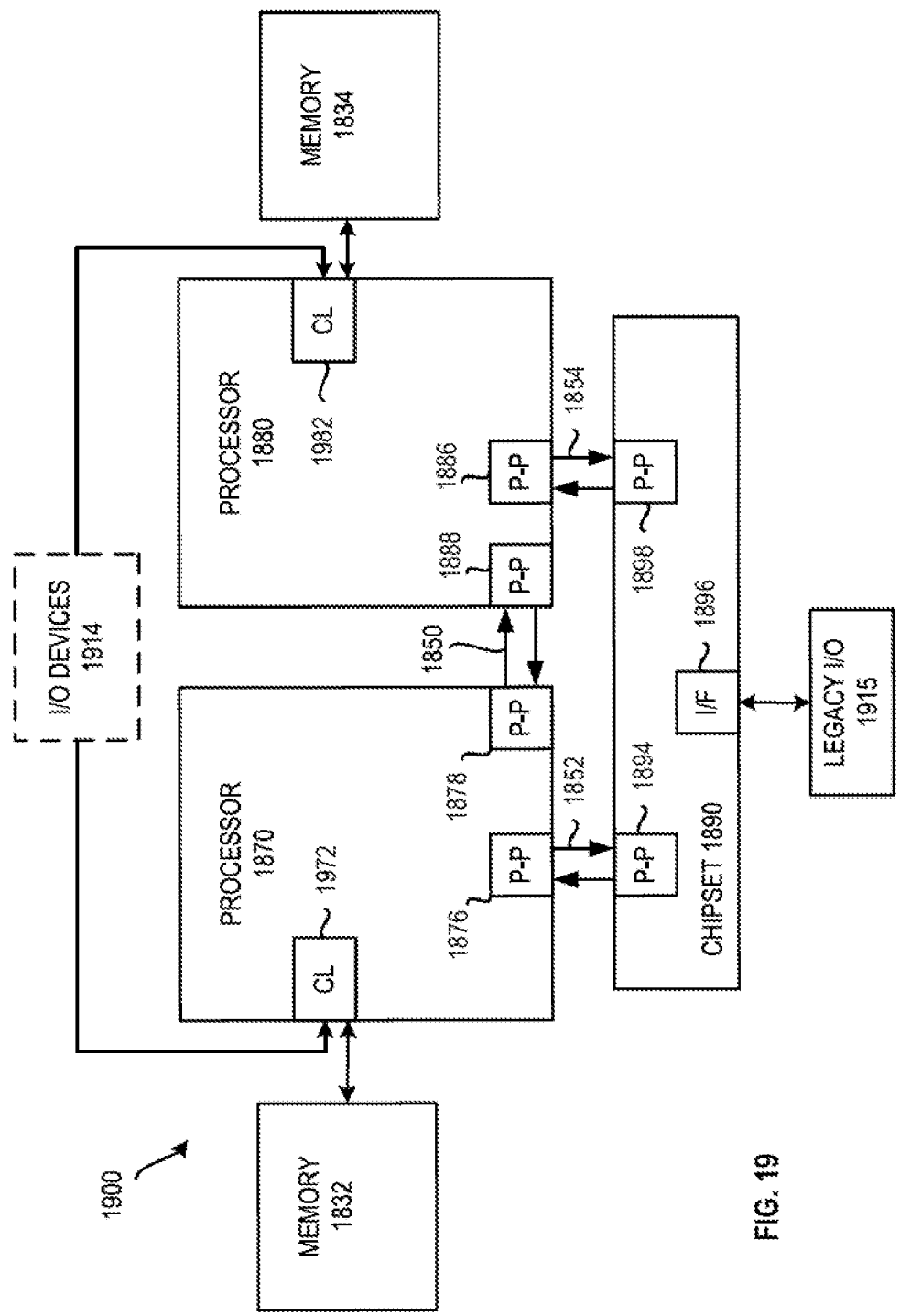
FIG. 19 is a block diagram of a third embodiment of a computer architecture.

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1972 and 1982, respectively. Thus, the CL 1972, 1982 include integrated memory controller units and include I/O control logic. FIG. 19 illustrates that not only are the memories 1832, 1834 coupled to the CL 1972, 1982, but also that I/O devices 1914 are also coupled to the control logic 1972, 1982. Legacy I/O devices 1915 are coupled to the chipset 1890.

Figure 20:
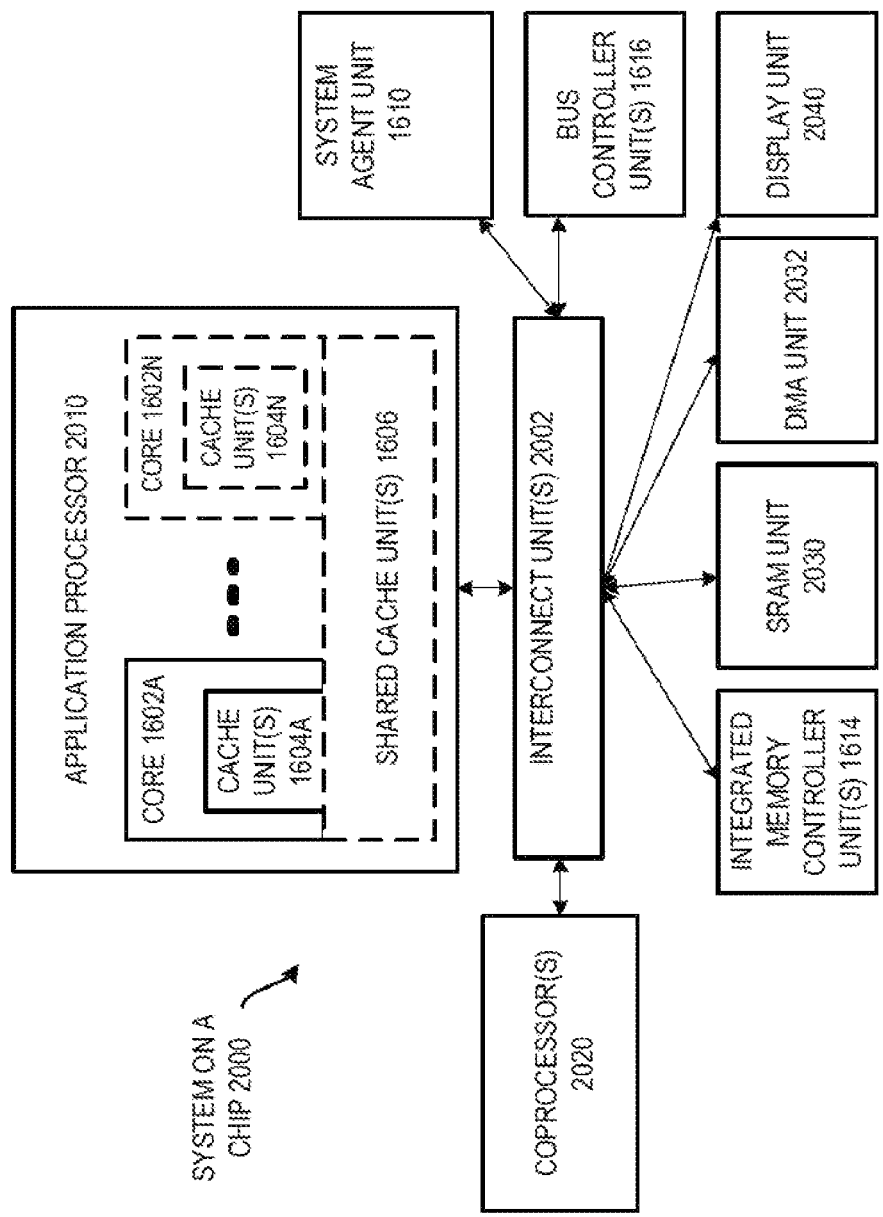
FIG. 20 is a block diagram of a fourth embodiment of a computer architecture.

Referring now to FIG. 20, shown is a block diagram of a system on a chip (SoC) 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; a static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
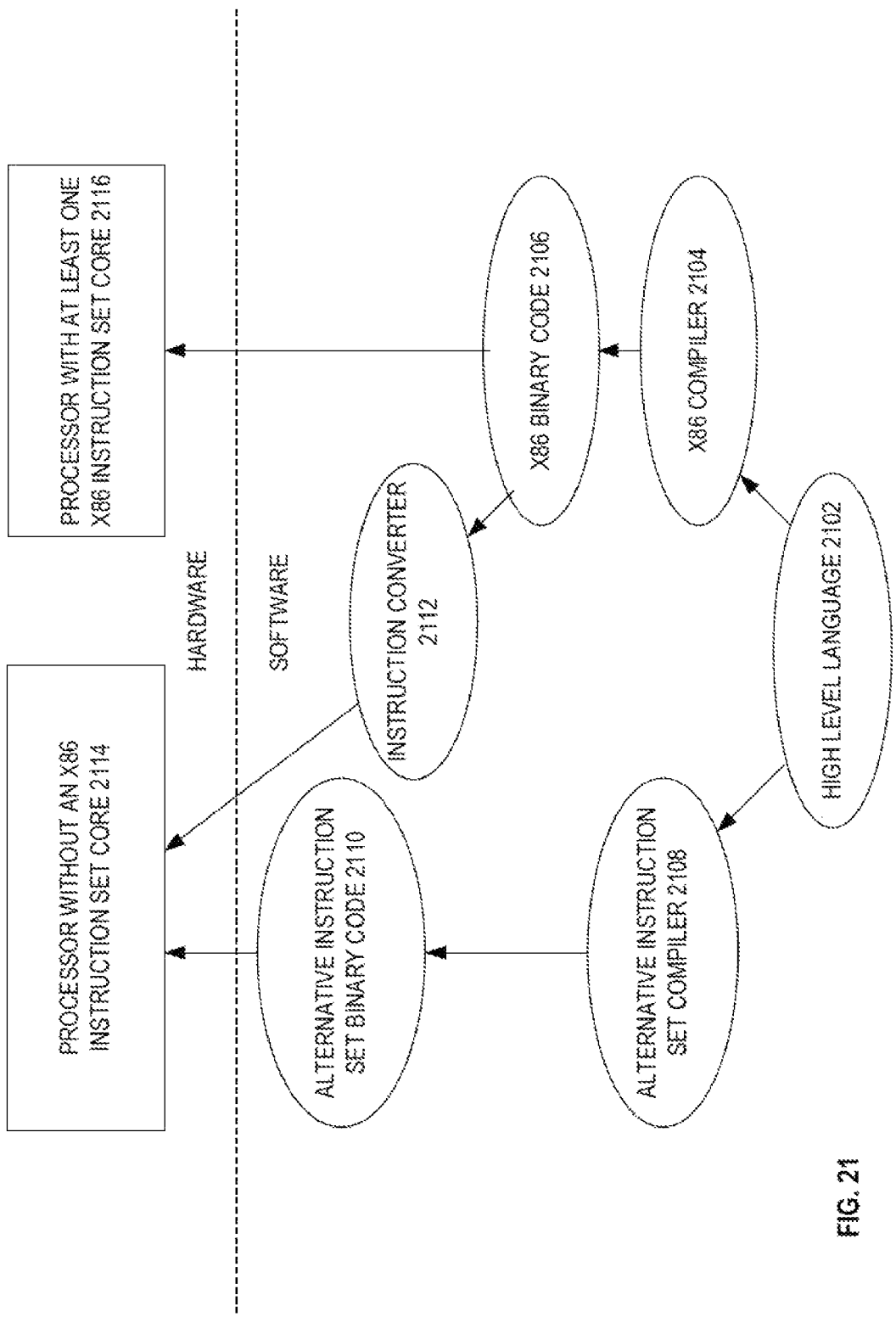
FIG. 21 is a block diagram of use of a software instruction converter to convert binary instructions in a source instruction set to binary instructions in a target instruction set, according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS® instruction set of MIPS® Technologies of Sunnyvale, CA and/or that execute the ARM® instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Components, features, and details described for any of the apparatus may also optionally apply to any of the methods, which in embodiments may be performed by and/or with such apparatus. Any of the processors described herein may be included in any of the computer systems disclosed herein. In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may be used. Each of these terms may be used to refer to hardware, firmware, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware selected from transistors, gates, and other circuitry components.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) that is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is an integrated circuit including a protected container access control logic to perform a set of access control checks and to determine whether to allow a device protected container module (DPCM) and an input and/or output (I/O) device to communicate securely through one of direct memory access (DMA) and memory-mapped input/output (MMIO). This determination is made after it has been determined that at least the DPCM and the I/O device are mapped to one another, an access address associated with the communication resolves into a protected container memory, and a page of the protected container memory into which the access address resolves allows for said one of DMA and MMIO.

Example 2 includes the integrated circuit of Example 1, in which the one of DMA and MMIO is DMA.

Example 3 includes the integrated circuit of Example 2, in which the protected container access control logic is to determine whether to allow the I/O device to access the page of the protected container memory.

Example 4 includes the integrated circuit of Example 2, in which the access address is to come from the I/O device and is to be accompanied by a Security Attributes of Initiator (SAI) corresponding to the I/O device. Also, the protected container access control logic is to determine that the DPCM and the I/O device are mapped to one another by using the SAI of the I/O device to obtain a DPCM identifier mapped to the SAI of the I/O device in a device mapping table and determine that the DPCM identifier obtained from the table corresponds to the DPCM.

Example 5 includes the integrated circuit of Example 2, in which the protected container access control logic is to access an allowed physical address that is to have been previously stored in a protected container page metadata structure, and is to determine to allow the DPCM and the I/O device to communicate securely after it has been determined that the access address is compatible with the allowed physical address.

Example 6 includes the integrated circuit of Example 5, further including a decode unit to decode an instruction, and an execution unit coupled with the decode unit, the execution unit, in response to the instruction, to store the allowed physical address in the protected container page metadata structure.

Example 7 includes the integrated circuit of Example 2, in which the protected container access control logic is to determine to allow the DPCM and the I/O device to communicate securely after it has been determined that the page has a type that is dedicated to allowing secure DMA.

Example 8 includes the integrated circuit of Example 2, in which the protected container access control logic includes an I/O memory management unit (MMU).

Example 9 includes the integrated circuit of Example 1, in which the one of DMA and MMIO is MMIO.

Example 10 includes the integrated circuit of Example 9, further including a memory management unit (MMU) to convert an address that resolves to the page of the protected container memory to an MMIO address for the I/O device.

Example 11 includes the integrated circuit of Example 9, in which the protected container access control logic is to provide a security identifier to accompany an access from the DPCM to the I/O device. Also, the security identifier is to attest to the I/O device that the access is from a DPCM that is mapped to the I/O device.

Example 12 includes the integrated circuit of Example 9, in which the protected container access control logic is to determine to allow the DPCM and the I/O device to communicate securely after it has been determined that the page has a type that is dedicated to allowing secure MMIO.

Example 13 includes the integrated circuit of Example 9, in which the protected container access control logic includes a memory management unit (MMU).

Example 14 includes the integrated circuit of any one of Examples 1 to 13, in which the protected container access control logic is to determine to allow the DPCM and the I/O device to communicate securely after it has been determined that a type of access is compatible with one or more allowed access types for the page that are to be stored in a protected container page metadata structure.

Example 15 includes the integrated circuit of any one of Examples 1 to 13, in which the protected container access control logic is to determine not to allow any other protected container modules to access the page of the protected container memory, and any privileged system software modules to access the page of the protected container memory.

Example 16 is a method in an integrated circuit including determining that a device protected container module (DPCM) and an input and/or output (I/O) device are mapped to one another. The method also includes determining that an access address associated with an attempted access by one of the DPCM and the I/O device resolves into a protected container memory. The method also includes determining that a page of the protected container memory into which the access address resolves allows for one of DMA and MMIO. The method also includes determining to allow the DPCM and the I/O device to communicate securely with one another through the page of the protected container memory.

Example 17 includes the method of Example 16, in which determining includes determining to allow the DPCM and the I/O device to perform secure DMA, and further including allowing the I/O device to access data in the page of the protected container memory.

Example 18 includes the method of Example 16, in which determining includes determining to allow the DPCM and the I/O device to perform secure MMIP.

Example 19 is a computer system including an interconnect, and a processor coupled with the interconnect. The processor to perform a set of access control checks and to determine to allow a device protected container module (DPCM) and an input and/or output (I/O) device to communicate securely through one of direct memory access (DMA) and memory-mapped input/output (MMIO). This determination is made after it has been determined that at least the DPCM and the I/O device are mapped to one another, an access address associated with the communication resolves into a protected container memory, and a page of the protected container memory into which the access address resolves allows for said one of DMA and MMIO. The computer system also includes a dynamic random access memory (DRAM) coupled with the interconnect. The DRAM may optionally store the DPCM in which the DPCM includes device driver instructions to communicate with the I/O device at a user level of privilege.

Example 20 includes the computer system of example 19, in which said one is DMA.

Example 21 is an article of manufacture including a non-transitory machine-readable storage medium. The non-transitory machine-readable storage medium stores instructions that if executed by a machine are to cause the machine to perform operations including requesting, from a protected container module in a protected container memory, that an input and/or output (I/O) device be mapped to the protected container module, accessing a page in the protected container memory that allows for one of direct memory access (DMA) and memory-mapped input/output (MMIO), and performing said one of DMA and MMIO with the I/O device through the page in the protected container memory.

Example 22 includes the article of manufacture of Example 21, in which the instructions that if executed cause the machine to perform said one of DMA and MMIO with the I/O device comprise instructions that if executed cause the machine to perform the DMA with the I/O device.

Example 23 includes the article of manufacture of any one of Examples 21 to 22, in which the instructions include a single instruction that if executed by the machine are to cause the machine to configure a page to be a type dedicated for secure DMA.

Example 24 includes the article of manufacture of Example 21, in which the instructions that if executed cause the machine to perform said one of DMA and MMIO with the I/O device comprise instructions that if executed cause the machine to perform the MMIO with the I/O device.

Example 25 includes the article of manufacture of any one of Examples 21 and 24, in which the instructions include a single instruction that if executed by the machine are to cause the machine to configure a page to be a type dedicated for secure MMIO.

Example 26 includes the processor of any one of Examples 1 to 13, further including an optional branch prediction unit to predict branches, and an optional instruction prefetch unit, coupled with the branch prediction unit, the instruction prefetch unit to prefetch instructions. The processor may also optionally include an optional level 1 (L1) instruction cache coupled with the instruction prefetch unit, the L1 instruction cache to store instructions, an optional L1 data cache to store data, and an optional level 2

(L2) cache to store data and instructions. The processor may also optionally include an instruction fetch unit coupled with the decode unit, the L1 instruction cache, and the L2 cache. The processor may also optionally include a register rename unit to rename registers, an optional scheduler to schedule one or more operations for execution, and an optional commit unit to commit execution results.

Example 27 is a processor or other apparatus to perform or operative to perform the method of any one of Examples 16 to 18.

Example 28 is a processor or other apparatus that includes components as disclosed herein for performing the method of any one of Examples 16 to 18.

Example 29 is a processor that includes any combination of modules and/or units and/or logic and/or circuitry as disclosed herein for performing the method of any one of Examples 16 to 18.

Example 30 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 16 to 18.

Example 31 is a processor or other apparatus as described herein.

Example 32 is a processor or other apparatus that is operative to perform any method as described herein.

What is claimed is:

1. A processor comprising:
   first circuitry to receive binary code and configuration information associated with the binary code, the configuration information including an address of a page of a protected container, an identifier corresponding to a memory-mapped input/output (MMIO) device, and an MMIO space offset; and
   second circuitry to perform operations corresponding to the binary code, including to:
      perform a plurality of security checks, including to:
         check that the identifier is mapped to the protected container; and
         check that a type of the page is an input/output type; and
      if the plurality of security checks succeed, configure the page to allow for secure MMIO with the MMIO device.

2. The processor of claim 1, wherein to configure the page to allow for the secure MMIO with the MMIO device includes to change a field in a data structure.

3. The processor of claim 2, wherein the data structure is to include information to indicate an address through which the page is allowed to be accessed, information to indicate the protected container to which the page belongs, and information to indicate whether the page is readable and/or writeable and/or executable.

4. The processor of claim 1, wherein to check that the identifier is mapped to the protected container comprises to check a table entry corresponding to the identifier in a table.

5. The processor of claim 1, wherein the binary code corresponds to a user-level privilege.

6. The processor of claim 1, wherein the page of the protected container is to be encrypted and opaque to privileged system-level software.

7. The processor of claim 1, wherein the protected container comprises an isolated execution environment.

8. The processor of claim 1, wherein to configure the page to allow for the secure MMIO with the MMIO device includes to change a field in a data structure, wherein the data structure is to include information to indicate an address through which the page is allowed to be accessed, information to indicate the protected container to which the page belongs, and information to indicate whether the page is readable and/or writeable and/or executable, and wherein to check that the identifier is mapped to the protected container comprises to check a table entry corresponding to the identifier in a table.

9. The processor of claim 8, wherein the binary code corresponds to a user-level privilege, wherein the page of the protected container is to be encrypted and opaque to privileged system-level software, and wherein the protected container comprises an isolated execution environment.

10. A processor comprising:
    first circuitry to receive an instruction, the instruction corresponding to a specified address of a page of a protected container, an identifier corresponding to a memory-mapped input/output (MMIO) device, and an MMIO space offset; and
    second circuitry to perform operations corresponding to the instruction, including to:
       perform a plurality of security checks, including to:
          check that the identifier is mapped to the protected container; and
          check that a type of the page is an input/output type; and
       if the plurality of security checks succeed, configure the page to allow for secure MMIO with the MMIO device.

11. The processor of claim 10, wherein to configure the page to allow for the secure MMIO with the MMIO device includes to change a field in a data structure.

12. The processor of claim 11, wherein the data structure is to include information to indicate an address through which the page is allowed to be accessed, information to indicate the protected container to which the page belongs, and information to indicate whether the page is readable and/or writeable and/or executable.

13. The processor of claim 10, wherein to check that the identifier is mapped to the protected container comprises to check a table entry corresponding to the identifier in a table.

14. The processor of claim 10, wherein the instruction corresponds to a user-level privilege.

15. The processor of claim 10, wherein the page of the protected container is to be encrypted and opaque to privileged system-level software.

16. The processor of claim 10, wherein the protected container comprises an isolated execution environment.

17. The processor of claim 10, wherein the page of the protected container is to be encrypted and opaque to privileged system-level software, wherein the protected container comprises an isolated execution environment, wherein to configure the page to allow for the secure MMIO with the MMIO device includes to change a field in a data structure, wherein the data structure is to include information to indicate an address through which the page is allowed to be accessed, information to indicate the protected container to which the page belongs, and information to indicate whether the page is readable and/or writeable and/or executable, and wherein the instruction corresponds to a user-level privilege.

18. A method comprising:
    receiving binary code and configuration information associated with the binary code, the configuration information including an address of a page of a protected container, an identifier corresponding to a memory-mapped input/output (MMIO) device, and an MMIO space offset; and performing operations corresponding to the binary code, including:
    performing a plurality of security checks, including:
        checking that the identifier is mapped to the protected container; and
        checking that a type of the page is an input/output type;
    determining that the plurality of security checks succeed; and
    after determining that the plurality of security checks succeed, configuring the page to allow for secure MMIO with the MMIO device.

19. The method of claim 18, wherein configuring the page to allow for the secure MMIO with the MMIO device includes changing a field in a data structure.

20. The method of claim 19, wherein the data structure includes information to indicate an address through which the page is allowed to be accessed, information to indicate the protected container to which the page belongs, and information to indicate whether the page is readable and/or writeable and/or executable.

21. The method of claim 18, wherein checking that the identifier is mapped to the protected container comprises checking a table entry corresponding to the identifier in a table.

22. The method of claim 18, wherein the binary code corresponds to a user-level privilege.

23. The method of claim 18, wherein the page of the protected container is encrypted and opaque to privileged system-level software.

24. The method of claim 18, wherein the protected container comprises an isolated execution environment.

25. The method of claim 18, wherein the protected container comprises an isolated execution environment, wherein the binary code corresponds to a user-level privilege, wherein configuring the page to allow for the secure MMIO with the MMIO device includes changing a field in a data structure, and wherein the data structure includes information to indicate an address through which the page is allowed to be accessed, information to indicate the protected container to which the page belongs, and information to indicate whether the page is readable and/or writeable and/or executable.

\* \* \* \* \*